United States Patent
Reed et al.

(10) Patent No.: US 9,204,523 B2
(45) Date of Patent: Dec. 1, 2015

(54) REMOTELY ADJUSTABLE SOLID-STATE LAMP

(71) Applicant: Express Imaging Systems, LLC, Seattle, WA (US)

(72) Inventors: William G. Reed, Seattle, WA (US); Dale H. DeGraff, Brier, WA (US)

(73) Assignee: Express Imaging Systems, LLC, Renton, WA (US)

( * ) Notice: Subject to any disclaimer, the term of this patent is extended or adjusted under 35 U.S.C. 154(b) by 245 days.

(21) Appl. No.: 13/875,130

(22) Filed: May 1, 2013

(65) Prior Publication Data

US 2013/0293112 A1 Nov. 7, 2013

Related U.S. Application Data

(60) Provisional application No. 61/641,781, filed on May 2, 2012.

(51) Int. Cl.
| | |
|---|---|
| *H01J 1/60* | (2006.01) |
| *H01J 7/42* | (2006.01) |
| *H05B 37/04* | (2006.01) |
| *H05B 37/02* | (2006.01) |
| *H05B 33/08* | (2006.01) |

(52) U.S. Cl.
CPC ........ *H05B 37/0272* (2013.01); *H05B 33/0863* (2013.01)

(58) Field of Classification Search
CPC .... B60Q 11/005; H01H 13/023; B61L 7/061; F02P 17/00; F21S 8/08
USPC .......................................................... 315/131
See application file for complete search history.

(56) References Cited

U.S. PATENT DOCUMENTS

| | | | |
|---|---|---|---|
| 2,745,055 A | 5/1956 | Woerdemann | |
| 4,153,927 A | 5/1979 | Owens | |

(Continued)

FOREIGN PATENT DOCUMENTS

| | | |
|---|---|---|
| DE | 4001980 A1 | 8/1990 |
| EP | 1 734 795 A1 | 12/2006 |

(Continued)

OTHER PUBLICATIONS

"Lcd Backlight I/O Ports and Power Protection Circuit Design," dated May 2, 2011, retrieved Jun. 10, 2011, retrieved from http://www.chipoy.info/gadgets/lcd-backlight-i-o-ports-and-power-pr . . . , 4 pages.

(Continued)

*Primary Examiner* — Quan Tra
(74) *Attorney, Agent, or Firm* — Seed IP Law Group PLLC

(57) ABSTRACT

Disclosed herein is a remotely adjustable lighting system. The lighting system includes a luminaire including one or more solid-state light systems and a non-line-of-sight wireless transceiver. The output intensity of the solid-state light systems is adjustable. The non-line-of-sight transceiver in the luminaire can receive one or more non-line-of-sight wireless signals transmitted by a transceiver in a general purpose handheld computing device. Instructions and data including configuration and output intensity adjustments may be communicated between the general purpose handheld computing device and the luminaire via one or more non-line-of-sight wireless signals.

31 Claims, 7 Drawing Sheets

(56) References Cited

U.S. PATENT DOCUMENTS

| | | | |
|---|---|---|---|
| 4,237,377 A | 12/1980 | Sansum | |
| 4,663,521 A | 5/1987 | Maile | |
| 5,086,379 A | 2/1992 | Denison et al. | |
| 5,160,202 A | 11/1992 | Légaré | |
| 5,161,107 A | 11/1992 | Mayeaux et al. | |
| 5,230,556 A | 7/1993 | Canty et al. | |
| 5,276,385 A | 1/1994 | Itoh et al. | |
| 5,343,121 A | 8/1994 | Terman et al. | |
| 5,349,505 A | 9/1994 | Poppenheimer | |
| 5,450,302 A | 9/1995 | Maase et al. | |
| 5,561,351 A | 10/1996 | Vrionis et al. | |
| 5,589,741 A | 12/1996 | Terman et al. | |
| 5,808,294 A | 9/1998 | Neumann | |
| 5,838,226 A | 11/1998 | Houggy et al. | |
| 6,111,739 A | 8/2000 | Wu et al. | |
| 6,149,283 A | 11/2000 | Conway et al. | |
| 6,377,191 B1 | 4/2002 | Takubo | |
| 6,612,720 B1 | 9/2003 | Beadle | |
| 6,681,195 B1 | 1/2004 | Poland et al. | |
| 6,746,274 B1 | 6/2004 | Verfuerth | |
| 6,753,842 B1 | 6/2004 | Williams et al. | |
| 6,828,911 B2 | 12/2004 | Jones et al. | |
| 6,841,947 B2 | 1/2005 | Berg-johansen | |
| 6,902,292 B2 | 6/2005 | Lai | |
| 6,985,827 B2 | 1/2006 | Williams et al. | |
| 7,019,276 B2 | 3/2006 | Cloutier et al. | |
| 7,066,622 B2 | 6/2006 | Alessio | |
| 7,081,722 B1 | 7/2006 | Huynh et al. | |
| 7,122,976 B1 | 10/2006 | Null et al. | |
| 7,188,967 B2 | 3/2007 | Dalton et al. | |
| 7,196,477 B2 | 3/2007 | Richmond | |
| 7,239,087 B2 | 7/2007 | Ball | |
| 7,252,385 B2 | 8/2007 | Engle et al. | |
| 7,258,464 B2 | 8/2007 | Morris et al. | |
| 7,270,441 B2 | 9/2007 | Fiene | |
| 7,281,820 B2 | 10/2007 | Bayat et al. | |
| 7,314,291 B2 | 1/2008 | Tain et al. | |
| 7,317,403 B2 | 1/2008 | Grootes et al. | |
| 7,322,714 B2 | 1/2008 | Barnett et al. | |
| 7,330,568 B2 | 2/2008 | Nagaoka et al. | |
| 7,339,323 B2 | 3/2008 | Bucur | |
| 7,339,471 B1 | 3/2008 | Chan et al. | |
| 7,405,524 B2 | 7/2008 | Null et al. | |
| 7,438,440 B2 | 10/2008 | Dorogi | |
| 7,440,280 B2 | 10/2008 | Shuy | |
| 7,468,723 B1 | 12/2008 | Collins | |
| 7,524,089 B2 | 4/2009 | Park | |
| 7,538,499 B2 | 5/2009 | Ashdown | |
| 7,547,113 B2 | 6/2009 | Lee | |
| 7,559,674 B2 | 7/2009 | He et al. | |
| 7,564,198 B2 | 7/2009 | Yamamoto et al. | |
| 7,569,802 B1 | 8/2009 | Mullins | |
| 7,578,596 B2 | 8/2009 | Martin | |
| 7,578,597 B2 | 8/2009 | Hoover et al. | |
| 7,627,372 B2 | 12/2009 | Vaisnys et al. | |
| 7,631,324 B2 | 12/2009 | Buonasera et al. | |
| 7,633,463 B2 | 12/2009 | Negru | |
| 7,638,743 B2 | 12/2009 | Bartol et al. | |
| 7,677,753 B1 | 3/2010 | Wills | |
| 7,688,002 B2 | 3/2010 | Ashdown et al. | |
| 7,688,222 B2 | 3/2010 | Peddie et al. | |
| 7,703,951 B2 | 4/2010 | Piepgras et al. | |
| 7,746,003 B2 | 6/2010 | Verfuerth et al. | |
| D621,410 S | 8/2010 | Verfuerth et al. | |
| D621,411 S | 8/2010 | Verfuerth et al. | |
| 7,804,200 B2 | 9/2010 | Flaherty | |
| 7,834,922 B2 | 11/2010 | Kurane | |
| 7,932,535 B2 | 4/2011 | Mahalingam et al. | |
| 7,940,191 B2 | 5/2011 | Hierzer | |
| 7,952,609 B2 | 5/2011 | Simerly et al. | |
| 7,960,919 B2 | 6/2011 | Furukawa | |
| 7,983,817 B2 | 7/2011 | Breed | |
| 7,985,005 B2 | 7/2011 | Alexander et al. | |
| 8,100,552 B2 | 1/2012 | Spero | |
| 8,118,456 B2 | 2/2012 | Reed et al. | |
| 8,143,769 B2 | 3/2012 | Li | |
| 8,174,212 B2 | 5/2012 | Tziony et al. | |
| 8,207,830 B2 * | 6/2012 | Rutjes et al. | 340/12.52 |
| 8,334,640 B2 | 12/2012 | Reed et al. | |
| 8,344,665 B2 | 1/2013 | Verfuerth et al. | |
| 8,376,583 B2 | 2/2013 | Wang et al. | |
| 8,445,826 B2 | 5/2013 | Verfuerth | |
| 8,476,565 B2 | 7/2013 | Verfuerth | |
| 8,586,902 B2 | 11/2013 | Verfuerth | |
| 8,604,701 B2 | 12/2013 | Verfuerth et al. | |
| 8,749,635 B2 | 6/2014 | Högasten et al. | |
| 8,764,237 B2 | 7/2014 | Wang et al. | |
| 8,779,340 B2 | 7/2014 | Verfuerth et al. | |
| 8,866,582 B2 | 10/2014 | Verfuerth et al. | |
| 8,884,203 B2 | 11/2014 | Verfuerth et al. | |
| 8,921,751 B2 | 12/2014 | Verfuerth | |
| 2002/0113192 A1 | 8/2002 | Antila | |
| 2003/0016143 A1 | 1/2003 | Ghazarian | |
| 2003/0184672 A1 | 10/2003 | Wu et al. | |
| 2004/0192227 A1 | 9/2004 | Beach et al. | |
| 2005/0231133 A1 | 10/2005 | Lys | |
| 2006/0014118 A1 | 1/2006 | Utama | |
| 2006/0066264 A1 | 3/2006 | Ishigaki et al. | |
| 2006/0098440 A1 | 5/2006 | Allen | |
| 2007/0032990 A1 | 2/2007 | Williams et al. | |
| 2007/0102033 A1 | 5/2007 | Petrocy | |
| 2007/0225933 A1 | 9/2007 | Shimomura | |
| 2008/0018261 A1 | 1/2008 | Kastner | |
| 2008/0043106 A1 | 2/2008 | Hassapis et al. | |
| 2008/0130304 A1 | 6/2008 | Rash et al. | |
| 2008/0232116 A1 | 9/2008 | Kim | |
| 2008/0266839 A1 | 10/2008 | Claypool et al. | |
| 2009/0046151 A1 | 2/2009 | Nagaoka et al. | |
| 2009/0058320 A1 | 3/2009 | Chou et al. | |
| 2009/0160358 A1 | 6/2009 | Leiderman | |
| 2009/0161356 A1 | 6/2009 | Negley et al. | |
| 2009/0167203 A1 | 7/2009 | Dahlman et al. | |
| 2009/0195179 A1 | 8/2009 | Joseph et al. | |
| 2009/0230883 A1 | 9/2009 | Haug | |
| 2009/0235208 A1 | 9/2009 | Nakayama et al. | |
| 2009/0261735 A1 | 10/2009 | Sibalich et al. | |
| 2009/0278479 A1 | 11/2009 | Platner et al. | |
| 2009/0284155 A1 | 11/2009 | Reed et al. | |
| 2009/0315485 A1 | 12/2009 | Verfuerth et al. | |
| 2010/0001652 A1 | 1/2010 | Damsleth | |
| 2010/0052557 A1 | 3/2010 | Van Der Veen et al. | |
| 2010/0123403 A1 | 5/2010 | Reed | |
| 2010/0164406 A1 | 7/2010 | Kost et al. | |
| 2010/0171442 A1 | 7/2010 | Draper et al. | |
| 2010/0246168 A1 | 9/2010 | Verfuerth et al. | |
| 2010/0259193 A1 | 10/2010 | Umezawa et al. | |
| 2010/0271802 A1 | 10/2010 | Recker et al. | |
| 2010/0277082 A1 | 11/2010 | Reed et al. | |
| 2010/0295454 A1 | 11/2010 | Reed | |
| 2010/0295455 A1 | 11/2010 | Reed | |
| 2010/0295946 A1 | 11/2010 | Reed et al. | |
| 2010/0309310 A1 | 12/2010 | Albright | |
| 2011/0001626 A1 | 1/2011 | Yip et al. | |
| 2011/0006703 A1 | 1/2011 | Wu et al. | |
| 2011/0026264 A1 | 2/2011 | Reed et al. | |
| 2011/0175518 A1 | 7/2011 | Reed et al. | |
| 2011/0215731 A1 | 9/2011 | Jeong et al. | |
| 2011/0221346 A1 | 9/2011 | Lee et al. | |
| 2011/0251751 A1 | 10/2011 | Knight | |
| 2011/0310605 A1 | 12/2011 | Renn et al. | |
| 2012/0001566 A1 | 1/2012 | Josefowicz et al. | |
| 2012/0019971 A1 | 1/2012 | Flaherty et al. | |
| 2012/0038490 A1 | 2/2012 | Verfuerth | |
| 2012/0119669 A1 | 5/2012 | Melanson et al. | |
| 2012/0169053 A1 | 7/2012 | Tchoryk, Jr. et al. | |
| 2012/0181935 A1 * | 7/2012 | Velazquez | 315/132 |
| 2012/0209755 A1 | 8/2012 | Verfuerth et al. | |
| 2012/0221154 A1 | 8/2012 | Runge | |
| 2012/0224363 A1 | 9/2012 | Van De Ven | |
| 2012/0230584 A1 | 9/2012 | Kubo et al. | |
| 2012/0242254 A1 * | 9/2012 | Kim et al. | 315/312 |
| 2012/0262069 A1 | 10/2012 | Reed | |
| 2013/0033183 A1 | 2/2013 | Verfuerth et al. | |
| 2013/0043792 A1 | 2/2013 | Reed | |

(56) References Cited

U.S. PATENT DOCUMENTS

| | | | |
|---|---|---|---|
| 2013/0049613 A1 | 2/2013 | Reed | |
| 2013/0126715 A1 | 5/2013 | Flaherty | |
| 2013/0131882 A1 | 5/2013 | Verfuerth et al. | |
| 2013/0141000 A1 | 6/2013 | Wei et al. | |
| 2013/0141010 A1 | 6/2013 | Reed et al. | |
| 2013/0163243 A1 | 6/2013 | Reed | |
| 2013/0193857 A1 | 8/2013 | Tlachac et al. | |
| 2013/0235202 A1 | 9/2013 | Nagaoka et al. | |
| 2013/0249429 A1* | 9/2013 | Woytowitz et al. | 315/246 |
| 2013/0340353 A1 | 12/2013 | Whiting et al. | |
| 2014/0001961 A1 | 1/2014 | Anderson et al. | |
| 2014/0078308 A1 | 3/2014 | Verfuerth | |
| 2014/0097759 A1 | 4/2014 | Verfuerth et al. | |
| 2014/0244044 A1* | 8/2014 | Davis et al. | 700/276 |
| 2014/0313719 A1 | 10/2014 | Wang et al. | |
| 2015/0015716 A1 | 1/2015 | Reed et al. | |
| 2015/0077019 A1 | 3/2015 | Reed et al. | |

FOREIGN PATENT DOCUMENTS

| | | |
|---|---|---|
| EP | 2 781 138 A1 | 9/2014 |
| FR | 2 883 306 A1 | 9/2006 |
| JP | 6-335241 A | 12/1994 |
| JP | 2001-333420 A | 11/2001 |
| JP | 2004-279668 A | 10/2004 |
| JP | 2004-320024 A | 11/2004 |
| JP | 2004-349065 A | 12/2004 |
| JP | 2005-198238 A | 7/2005 |
| JP | 2005/310997 A | 11/2005 |
| JP | 2006-179672 A | 7/2006 |
| JP | 2006-244711 A | 9/2006 |
| JP | 2008-59811 A | 3/2008 |
| JP | 2008-509538 A | 3/2008 |
| JP | 2008-130523 A | 6/2008 |
| JP | 2008-159483 A | 7/2008 |
| JP | 2008-177144 A | 7/2008 |
| JP | 2008/535279 A | 8/2008 |
| JP | 2010-504628 A | 2/2015 |
| KR | 2005078403 A | 8/2005 |
| KR | 10-2006-0086254 A | 7/2006 |
| KR | 10-2009-0042400 A | 4/2009 |
| KR | 10-0935736 B1 | 1/2010 |
| KR | 20-2010-0007230 U | 7/2010 |
| KR | 10-1001276 B1 | 12/2010 |
| KR | 10-1044224 B1 | 6/2011 |
| KR | 10-1150876 B1 | 5/2012 |
| WO | 02/076068 A1 | 9/2002 |
| WO | 03/056882 A1 | 7/2003 |
| WO | 206/057866 A2 | 6/2006 |
| WO | 2007/023454 A1 | 3/2007 |
| WO | 2007/036873 A2 | 4/2007 |
| WO | 2008/030450 A2 | 3/2008 |
| WO | 2008/034242 A1 | 3/2008 |
| WO | 2012/006710 A1 | 1/2012 |
| WO | 2012/142115 A2 | 10/2012 |
| WO | 2013/074900 A1 | 5/2013 |
| WO | 2009/040703 A2 | 7/2013 |
| WO | 2014/018773 A1 | 1/2014 |
| WO | 2014/039683 A1 | 3/2014 |
| WO | 2014/078854 A1 | 5/2014 |

OTHER PUBLICATIONS

EE Herald, "Devices to protect High brightness LED from ESD," dated Mar. 16, 2009, retrieved Jun. 10, 2011, retrieved from http://www.eeherald.com/section/new-products/np100779.html, 1 page.

International Search Report, mailed Dec. 13, 2010 for PCT/US2010/035649, 3 pages.

International Search Report, mailed Dec. 15, 2010 for PCT/US2010/035658, 3 pages.

International Search Report, mailed Dec. 28, 2010 for PCT/US2010/035651, 3 pages.

International Search Report, mailed Jul. 9, 2009 for PCT/US2009/043171, 5 pages.

International Search Report, mailed Jun. 21, 2010 for PCT/US2009/064625, 3 pages.

International Search Report, mailed Oct. 8, 2012 for PCT/US2012/033059, 3 pages.

Littelfuse, "Application Note: Protecting LEDs in Product Designs," 2009, 2 pages.

Panasonic Electronic Components, "LED Lighting Solutions," 2009, 6 pages.

Renesas Electronics, "Zener Diodes for Surge Absorption—Applications of high-intensity LED," Apr. 2010, 1 page.

Tyco Electronics, "Circuit Protection," retrieved Jun. 10, 2011, retrieved from http://www.tycoelectronics.com/en/products/circuit-protection.html, 2 pages.

Written Opinion, mailed Dec. 13, 2010 for PCT/US2010/035649, 4 pages.

Written Opinion, mailed Dec. 15, 2010 for PCT/US2010/035658, 3 pages.

Written Opinion, mailed Dec. 28, 2010 for PCT/US2010/035651, 3 pages.

Written Opinion, mailed Jul. 9, 2009 for PCT/US2009/043171, 8 pages.

Written Opinion, mailed Jun. 21, 2010 for PCT/US2009/064625, 5 pages.

Written Opinion, mailed Oct. 8, 2012 for PCT/US2012/033059, 3 pages.

Reed et al., "Apparatus and Method for Schedule Based Operation of a Luminaire" U.S. Appl. No. 13/604,327, filed Sep. 5, 2012, 44 pages.

Reed et al., "Apparatus and Method of Operating a Luminaire," U.S. Appl. No. 13/558,191, filed Jul. 25, 2012, 84 pages.

Reed et al., "Apparatus, Method to Enhance Color Contrast in Phosphor-Based Solid State Lights," U.S. Appl. No. 61/534,722, filed Sep. 14, 2011, 53 pages.

Reed et al., "Gas-Discharge Lamp Replacement," U.S. Appl. No. 61/052,924, filed May 13, 2008, 32 pages.

Reed et al., "Low-Profile Pathway Illumination System," Amendment filed Jul. 29, 2011, for U.S. Appl. No. 12/437,472, 19 pages.

Reed et al., "Low-Profile Pathway Illumination System," U.S. Appl. No. 61/051,619, filed May 8, 2008, 25 pages.

Reed et al., "Low-Profile Pathway Illumination System," Notice of Allowance, dated Oct. 14, 2011, for U.S. Appl. No. 12/437,472, 9 pages.

Reed et al., "Low-Profile Pathway Illumination System," Office Action, dated May 5, 2011, for U.S. Appl. No. 12/437,472, 24 pages.

Reed et al., "Systems and Methods That Employ Object Recognition," U.S. Appl. No. 13/411,321, filed Mar. 2, 2012, 51 pages.

Reed et al., "Apparatus, Method to Change Light Source Color Temperature with Reduced Optical Filtering Losses," U.S. Appl. No. 61/295,519, filed Jan. 15, 2010, 35 pages.

Reed et al., "Apparatus, Method to Change Light Source Color Temperature with Reduced Optical Filtering Losses," U.S. Appl. No. 61/406,490, filed Oct. 25, 2010, 46 pages.

Reed et al., "Electrically Isolated Heat Sink for Solid-State Light," U.S. Appl. No. 61/229,435, filed Jul. 29, 2009, 29 pages.

Reed et al., "Electrostatic Discharge Protection for Luminaire," Office Action mailed Mar. 15, 2013 for U.S. Appl. No. 13/212,074, 11 pages.

Reed et al., "Gas-Discharge Lamp Replacement with Passive Cooling," U.S. Appl. No. 61/174,913, filed May 1, 2009, 29 pages.

Reed et al., "Long-Range Motion Detection for Illumination Control," U.S. Appl. No. 61/180,017, filed May 20, 2009, 32 pages.

Reed et al., "Turbulent Flow Cooling for Electronic Ballast," U.S. Appl. No. 61/088,651, filed Aug. 13, 2008, 23 pages.

Reed, "Apparatus and Method of Energy Efficient Illumination Using Received Signals ," U.S. Appl. No. 13/085,301, filed Apr. 12, 2011, 99 pages.

Reed, "Electronic Control to Regulate Power for Solid-State Lighting and Methods Thereof," U.S. Appl. No. 61/115,438, filed Nov. 17, 2008, 51 pages.

Reed, "Luminaire With Atmospheric Electrical Activity Detection and Visual Alert Capabilities," U.S. Appl. No. 13/786,114, filed Mar. 5, 2013, 52 pages.

(56) References Cited

OTHER PUBLICATIONS

Reed, "Resonant Network for Reduction of Flicker Perception in Solid State Lighting Systems," U.S. Appl. No. 61/527,029, filed Aug. 24, 2011, 41 pages.

Reed, "Apparatus and Method of Energy Efficient Illumination," Amendment filed Apr. 2, 2013, for U.S. Appl. No. 12/784,093, 13 pages.

Reed, "Apparatus and Method of Energy Efficient Illumination," Notice of Allowance mailed Apr. 12, 2013, for U.S. Appl. No. 12/784,093, 9 pages.

Reed, "Apparatus and Method of Energy Efficient Illumination," Office Action mailed Dec. 5, 2012, for U.S. Appl. No. 12/784,093, 13 pages.

Reed, "Apparatus and Method of Energy Efficient Illumination," U.S. Appl. No. 61/333,983, filed May 12, 2010, 57 pages.

Reed, "Apparatus and Method of Energy Efficient Illumination," U.S. Appl. No. 61/346,263, filed May 19, 2010, 67 pages.

Reed, "Electronic Control to Regulate Power for Solid-State Lighting and Methods Thereof," U.S. Appl. No. 61/154,619, filed Feb. 23, 2009, 62 pages.

Renn et al., "Solid State Lighting Device and Method Employing Heat Exchanger Thermally Coupled Circuit Board," U.S. Appl. No. 61/357,421, filed Jun. 22, 2010, 49 pages.

International Search Report, mailed Nov. 19, 2013 for PCT/US2013/052092, 4 pages.

International Search Report, mailed Dec. 30, 2013 for PCT/US2013/058266, 3 pages.

Reed, "Apparatus and Method of Energy Efficient Illumination," Office Action mailed Nov. 27, 2013, for U.S. Appl. No. 13/943,537, 8 pages.

Reed, "Apparatus and Method of Energy Efficient Illumination Using Received Signals," Amendment filed Jan. 2, 2014, for U.S. Appl. No. 13/085,301, 26 pages.

Reed, "High Efficiency Power Controller for Luminaire," U.S. Appl. No. 61/905,699, filed Nov. 18, 2013, 5 pages.

Written Opinion, mailed Nov. 19, 2013 for PCT/US2013/052092, 7 pages.

Written Opinion, mailed Dec. 30, 2013 for PCT/US2013/058266, 8 pages.

Reed et al., "Apparatus and Method for Schedule Based Operation of a Luminaire," Office Action mailed Mar. 26, 2014, for U.S. Appl. No. 13/604,327, 10 pages.

Reed et al., "Long-Range Motion Detection for Illumination Control," Amendment filed Apr. 28, 2014, for U.S. Appl. No. 12/784,080, 20 pages.

Reed, "Apparatus and Method of Energy Efficient Illumination," Notice of Allowance mailed Apr. 11, 2014, for U.S. Appl. No. 13/943,537, 9 pages.

Reed, "Apparatus and Method of Energy Efficient Illumination Using Received Signals," Office Action mailed Apr. 23, 2014, for U.S. Appl. No. 13/085,301, 12 pages.

Reed, "Electronic Control to Regulate Power for Solid-State Lighting and Methods Thereof," Office Action mailed Mar. 26, 2014, for U.S. Appl. No. 12/619,535, 16 pages.

Fairchild Semiconductor, "LED Application Design Guide Using Half-Bridge LLC Resonant Converter for 100W Street Lighting," AN-9729, Fairchild Semiconductor Corporation, Rev. 1.0.0, Mar. 22, 2011, 17 pages.

Huang, "Designing an LLC Resonant Half-Bridge Power Converter," 2010 Texas Instruments Power Supply Design Seminar, SEM1900, Topic 3, TI Literature No. SLUP263, Copyright 2010, 2011, Texas Instruments Incorporated, 28 pages.

International Search Report, mailed Sep. 30, 2011 for PCT/US2011/021359, 3 pages.

International Search Report, mailed Jan. 14, 2013 for PCT/US2012/052009, 3 pages.

International Search Report, mailed Feb. 27, 2013 for PCT/US2012/065476, 3 pages.

Kadirvel et al., "Self-Powered, Ambient Light Sensor Using bq25504," Texas Instruments, Application Report, SLUA629—Jan. 2012, 6 pages.

Reed et al., "Adjustable Output Solid-State Lamp With Security Features," U.S. Appl. No. 61/561,616, filed Nov. 18, 2011, 33 pages.

Reed et al., "Long-Range Motion Detection for Illumination Control," Office Action mailed Dec. 21, 2012, for U.S. Appl. No. 12/784,080, 26 pages.

Reed et al., "Long-Range Motion Detection for Illumination Control," Amendment filed Apr. 22, 2013, for U.S. Appl. No. 12/784,080, 17 pages.

Reed et al., "Long-Range Motion Detection for Illumination Control," Office Action mailed Jul. 22, 2013, for U.S. Appl. No. 12/784,080, 29 pages.

Reed et al., "Long-Range Motion Detection for Illumination Control," Amendment filed Sep. 27, 2013, for U.S. Appl. No. 12/784,080, 20 pages.

Reed et al., "Remotely Adjustable Solid-State Lamp," U.S. Appl. No. 61/641,781, filed May 2, 2012, 65 pages.

Reed, "Adjustable Output Solid-State Lighting Device," U.S. Appl. No. 61/567,308, filed Dec. 6, 2011, 49 pages.

Reed, "Apparatus and Method of Energy Efficient Illumination," Office Action mailed Dec. 5, 2012, for U.S. Appl. No. 12/784,091, 18 pages.

Reed, "Apparatus and Method of Energy Efficient Illumination," Amendment filed Apr. 4, 2013, for U.S. Appl. No. 12/784,091, 15 pages.

Reed, "Apparatus and Method of Energy Efficient Illumination," Office Action mailed Apr. 24, 2013, for U.S. Appl. No. 12/784,091, 12 pages.

Reed, "Apparatus and Method of Energy Efficient Illumination," Amendment filed May 14, 2013, for U.S. Appl. No. 12/784,091, 9 pages.

Reed, "Apparatus and Method of Energy Efficient Illumination," Notice of Allowance mailed May 23, 2013, for U.S. Appl. No. 12/784,091, 6 pages.

Reed, "Apparatus and Method of Energy Efficient Illumination," U.S. Appl. No. 13/943,537, filed Jul. 16, 2013, 67 pages.

Reed, "Apparatus and Method of Energy Efficient Illumination Using Received Signals," Office Action mailed Oct. 1, 2013, for U.S. Appl. No. 13/085,301, 11 pages.

Reed, "Electronic Control to Regulate Power for Solid-State Lighting and Methods Thereof," Office Action mailed Feb. 28, 2013, for U.S. Appl. No. 12/619,535, 17 pages.

Reed, "Electronic Control to Regulate Power for Solid-State Lighting and Methods Thereof," Amendment filed May 24, 2013, for U.S. Appl. No. 12/619,535, 21 pages.

Reed, "Electronic Control to Regulate Power for Solid-State Lighting and Methods Thereof," Office Action mailed Jul. 30, 2013, for U.S. Appl. No. 12/619,535, 15 pages.

Reed, "Electronic Control to Regulate Power for Solid-State Lighting and Methods Thereof," Amendment filed Oct. 30, 2013, for U.S. Appl. No. 12/619,535, 5 pages.

Reed, "Electrostatic Discharge Protection for Luminaire," Amendment filed Jun. 17, 2013, for U.S. Appl. No. 13/212,074, 11 pages.

Reed, "Electrostatic Discharge Protection for Luminaire," Notice of Allowance mailed Sep. 12, 2013, for U.S. Appl. No. 13/212,074, 6 pages.

Reed, "Luminaire With Ambient Sensing and Autonomous Control Capabilities," U.S. Appl. No. 61/728,150, filed Nov. 19, 2012, 83 pages.

Reed, "Luminaire With Ambient Sensing and Autonomous Control Capabilities," U.S. Appl. No. 13/786,332, filed Mar. 5, 2013, 86 pages.

Reed, "Luminaire With Atmospheric Electrical Activity Detection and Visual Alert Capabilities," U.S. Appl. No. 61/649,159, filed Aug. 28, 2012, 52 pages.

Reed, "Luminaire With Switch-Mode Converter Power Monitoring," U.S. Appl. No. 61/723,675, filed Nov. 7, 2012, 73 pages.

Reed, "Luminaire With Switch-Mode Converter Power Monitoring," U.S. Appl. No. 14/074,166, filed Nov. 7, 2013, 73 pages.

Reed, "Photocontrol for Luminaire Consumes Very Low Power," U.S. Appl. No. 61/849,841, filed Jul. 24, 2013, 41 pages.

(56) References Cited

OTHER PUBLICATIONS

Reed, "Resonant Network for Reduction of Flicker Perception in Solid State Lighting Systems," Notice of Allowance mailed Sep. 30, 2013, for U.S. Appl. No. 13/592,590, 9 pages.
Reed, "Solid State Hospitality Lamp," U.S. Appl. No. 61/692,619, filed Aug. 23, 2012, 32 pages.
Reed, "Solid State Hospitality Lamp," U.S. Appl. No. 13/973,696, filed Aug. 22, 2013, 32 pages.
Reed, "Solid State Lighting, Drive Circuit and Method of Driving Same," U.S. Appl. No. 61/640,963, filed May 1, 2012, 24 pages.
Reed, "Solid State Lighting, Drive Circuit and Method of Driving Same," U.S. Appl. No. 13/875,000, filed May 1, 2013, 24 pages.
Written Opinion, mailed Sep. 30, 2011 for PCT/US2011/021359, 4 pages.
Written Opinion, mailed Jan. 14, 2013 for PCT/US2012/052009, 5 pages.
Written Opinion, mailed Feb. 27, 2013, for PCT/US2012/065476, 8 pages.
Reed et al., "Adjustable Output Solid-State Lamp With Security Features," Amendment filed Jun. 24, 2014, for U.S. Appl. No. 13/679,687, 11 pages.
Reed et al., "Apparatus and Method for Schedule Based Operation of a Luminaire," Amendment filed Jun. 24, 2014, for U.S. Appl. No. 13/604,327, 14 pages.
Reed et al., "Apparatus and Method for Schedule Based Operation of a Luminaire," Notice of Allowance mailed Jul. 7, 2014, for U.S. Appl. No. 13/604,327, 8 pages.
Reed et al., "Long-Range Motion Detection for Illumination Control," Notice of Allowance mailed Jun. 20, 2014, for U.S. Appl. No. 12/784,080, 7 pages.
Reed, "Apparatus and Method of Energy Efficient Illumination," U.S. Appl. No. 14/329,508, filed Jul. 11, 2014, 61 pages.
Reed, "Apparatus and Method of Energy Efficient Illumination Using Received Signals," Amendment filed Jul. 23, 2014, for U.S. Appl. No. 13/085,301, 12 pages.
Reed, "Electronic Control to Regulate Power for Solid-State Lighting and Methods Thereof," Amendment filed May 27, 2014, for U.S. Appl. No. 12/619,535, 22 pages.
Reed, "Luminaire With Atmospheric Electrical Activity Detection and Visual Alert Capabilities," Notice of Allowance mailed Jul. 1, 2014, for U.S. Appl. No. 13/786,114, 9 pages.
Extended European Search Report, dated Aug. 13, 2014, for corresponding European Application No. 09826926.9, 8 pages.
Reed et al., "Adjustable Output Solid-State Lamp With Security Features," Notice of Allowance mailed Aug. 29, 2014, for U.S. Appl. No. 13/679,687, 9 pages.
Reed et al., "Systems and Methods That Employ Object Recognition," Office Action mailed Aug. 25, 2014, for U.S. Appl. No. 13/411,321, 35 pages.
Reed, "Apparatus and Method of Energy Efficient Illumination," Office Action mailed Aug. 28, 2014, for U.S. Appl. No. 14/329,508, 8 pages.
Reed, "Apparatus and Method of Energy Efficient Illumination Using Received Signals," Notice of Allowance mailed Jul. 30, 2014, for U.S. Appl. No. 13/085,301, 5 pages.
Reed, "Electronic Control to Regulate Power for Solid-State Lighting and Methods Thereof," Office Action mailed Aug. 14, 2014, for U.S. Appl. No. 12/619,535, 16 pages.
International Search Report mailed Nov. 11, 2014, for International Application No. PCT/US2014/047867, 3 pages.
Reed et al., "Systems and Methods That Employ Object Recognition," Amendment filed Nov. 21, 2014, for U.S. Appl. No. 13/411,321, 20 pages.
Reed, "Apparatus and Method of Energy Efficient Illumination," Amendment filed Sep. 30, 2014, for U.S. Appl. No. 14/329,508, 18 pages.
Reed, "Apparatus and Method of Energy Efficient Illumination," Notice of Allowance mailed Nov. 5, 2014, for U.S. Appl. No. 14/329,508, 10 pages.
Reed, "Apparatus and Method of Energy Efficient Illumination Using Received Signals," U.S. Appl. No. 14/557,275, filed Dec. 1, 2014, 92 pages.
Reed, "Asset Management System for Outdoor Luminaires," U.S. Appl. No. 62/082,463, filed Nov. 20, 2014, 56 pages.
Reed, "Centralized Control of Area Lighting Hours of Illumination," U.S. Appl. No. 62/057,419, filed Sep. 30, 2014, 39 pages.
Reed, "Detection and Correction of Faulty Photo Controls in Outdoor Luminaires," U.S. Appl. No. 62/068,517, filed Oct. 24, 2014, 47 pages.
Reed, "High Efficiency Power Controller for Luminaire," U.S. Appl. No. 14/546,354, filed Nov. 18, 2014, 33 pages.
Written Opinion mailed Nov. 11, 2014, for International Application No. PCT/US2014/047867, 5 pages.
Japanese Office Action, dated Jan. 6, 2015, for corresponding Japanese Application No. 2011-536564, 6 pages.
Reed et al., "Apparatus and Method of Operating a Luminaire," Office Action mailed Dec. 22, 2014, for U.S. Appl. No. 13/558,191, 17 pages.
Reed, "Adjustable Output Solid-State Lighting Device," Office Acton mailed Jan. 2, 2015, for U.S. Appl. No. 13/707,123, 24 pages.
Reed, "Electronic Control to Regulate Power for Solid-State Lighting and Methods Thereof," Amendment filed Dec. 15, 2014, for U.S. Appl. No. 12/619,535, 21 pages.
Reed, "Luminaire With Ambient Sensing and Autonomous Control Capabilities," Office Action mailed Dec. 17, 2014, for U.S. Appl. No. 13/786,332, 20 pages.
International Search Report, mailed Feb. 26, 2014, for PCT/US2013/070794, 3 pages.
Reed et al., "Adjustable Output Solid-State Lamp With Security Features," Office Action mailed Feb. 27, 2014, for U.S. Appl. No. 13/679,687, 11 pages.
Reed et al., "Long-Range Motion Detection for Illumination Control," Office Action mailed Jan. 30, 2014, for U.S. Appl. No. 12/784,080, 26 pages.
Reed, "Ambient Light Control in Solid State Lamps and Luminaires," U.S. Appl. No. 61/933,733, filed Jan. 30, 2014, 8 pages.
Reed, "Photocontrol for Luminaire Consumes Very Low Power," U.S. Appl. No. 14/158,630, filed Jan. 17, 2014, 71 pages.
Reed, "Systems, Methods, and Apparatuses for Using a High Current Switching Device As a Logic Level Sensor," U.S. Appl. No. 61/764,395, filed Feb. 13, 2013, 48 pages.
Reed, "Systems, Methods, and Apparatuses for Using a High Current Switching Device As a Logic Level Sensor," U.S. Appl. No. 14/179,737, filed Feb. 13, 2014, 48 pages.
Written Opinion, mailed Feb. 26, 2014, for PCT/US2013/070794, 10 pages.
Reed et al., "Apparatus and Method for Schedule Based Operations of a Luminaire," Office Action mailed Mar. 2, 2015, for U.S. Appl. No. 14/552,274, 7 pages.
Reed et al., "Apparatus and Method of Operating a Luminaire," Amendment filed Mar. 19, 2015, for U.S. Appl. No. 13/558,191, 20 pages.
Reed et al., "Systems and Methods That Employ Object Recognition," Office Action mailed Feb. 9, 2015, for U.S. Appl. No. 13/411,321, 40 pages.
Reed, "Adjustable Output Solid-State Lighting Device," Amendment filed Apr. 2, 2015, for U.S. Appl. No. 13/707,123, 14 pages.
Reed, "Ambient Light Control in Solid State Lamps and Luminaires," Amendment filed Jan. 29, 2015, for U.S. Appl. No. 14/609,168, 12 pages.
Reed, "Ambient Light Control in Solid State Lamps and Luminaires," U.S. Appl. No. 14/609,168, filed Jan. 29, 2015, 77 pages.
Reed, "Low Power Photocontrol for Luminaire," U.S. Appl. No. 62/137,666, filed Mar. 24, 2015, 36 pages.
Reed, "Luminaire With Adjustable Illumination Pattern," U.S. Appl. No. 62/114,826, filed Feb. 11, 2015, 68 pages.
Reed, "Luminaire With Ambient Sensing and Autonomous Control Capabilities," Amendment filed Mar. 13, 2015, for U.S. Appl. No. 13/786,332, 23 pages.

* cited by examiner

REMOTELY ADJUSTABLE SOLID-STATE LAMP

BACKGROUND

1. Technical Field

This disclosure is generally related to solid-state lamps.

2. Description of the Related Art

Fixed intensity lighting has been in use for more than a century. While fixed intensity lighting is useful in many applications, some applications benefit from the ability to control lighting intensity, adjust lighting intensity or synchronize lighting intensity with one or more scheduled events. In one particular application, it may be desirable to adjust the intensity of only a portion of the lighting fixtures or luminaires used in a specific location such as an industrial facility, parking lot, or commercial establishment. Adjusting the intensity of only a portion of the luminaires within a given location enables the use of selective or scheduled lighting scheme. For example, luminaires above a continuously occupied (i.e., 24/7/365) work area may be maintained at maximum intensity at all times, while other luminaires above a periodically occupied work area (e.g., a work area occupied from 9:00 A to 5:00 P Monday through Friday) may be at maximum intensity while the work area is in occupied, and at a lesser intensity level when the work area is unoccupied. In another example, variable intensity luminaires may be desirable in a consumer shopping area where well-lit temporary kiosks or seasonal displays reduce the need for general lighting for limited periods of time in areas surrounding the kiosk or seasonal display.

A single electrical circuit is frequently used to provide power to multiple luminaires thereby limiting the ability to control the intensity of an individual luminaire on the electrical circuit, as a change in any electrical parameter (e.g., a reduction in voltage) will be reflected in ALL of the luminaires coupled to the electric circuit. Additionally, luminaires are frequently mounted at elevations rendering physical access to controls on individual luminaires, impractical, difficult, dangerous, or a combination of all three. Physical access to a luminaire for disconnection, maintenance, or manual adjustment of the intensity of an individual luminaire frequently requires the use of specialized equipment such as a "bucket truck" or self-propelled scissor lift. The need for specialized equipment requires following safety procedures, such as blocking off the work area and posting an additional worker to stand as a look-out, to protect both the maintenance person and any potential customers in the vicinity of the maintenance. Thus, individually adjusting the intensity of each luminaire can be disruptive, time-consuming, and costly.

The use of inexpensive dimmer switches to control the intensity of individual luminaires is possible where incandescent lamps are used. However, the inherent energy inefficiency and relatively short operating life of incandescent lamps is both financially unsound, requiring dimmer control wiring between each luminaire and a dimmer switch, and ecologically wasteful, using inefficient, short-lived, incandescent lamps. Other lamps, for example high efficiency lighting devices, such as metal halide lighting devices, typically cannot be dimmed effectively. Although some metal halide ballasts are configured to permit dimming, such ballasts generally require extensive wiring and control systems to enable dimming.

Other approaches to adjusting the intensity of individual luminaires include manufacturing incandescent lighting devices with multiple incandescent filaments, or installing neutral density filters within lighting devices. Incandescent lighting devices having multiple incandescent filaments typically require connection to a multiple-position switch in order to select one or more of the filaments within the lighting device. Similar to the approach using a wall-mounted dimmer, connecting additional wiring to support use of a multiple-position switch adds hardware and labor costs to the lighting installation. Additionally, installing filters to adjust the output intensity of the lighting device wastes energy by reducing the overall output of the lighting device and suffers from the drawbacks associated with having a person physically elevated to the lighting device to install the filters.

BRIEF SUMMARY

A general purpose handheld computing device may be summarized as including at least one antenna; at least one transceiver communicatively coupled to the at least one antenna to provide wireless, non-line-of-sight communications with at least one luminaire having at least one solid-state light source; at least one processor, communicatively coupled to the at least one transceiver; at least one non-transitory processor-readable medium that stores processor executable instructions which, when executed by the at least one processor, cause the at least one processor to cause the at least one transceiver to wirelessly transmit non-line-of-sight signals to the at least one luminaire encoding at least one of commands or data that cause at least one of: an adjustment of a level of illumination provided by the at least one luminaire; an adjustment of a real time clock of the at least one luminaire; a daylight savings time change date to be set; a time to be set to adjust a level of illumination provide by the at least one luminaire; an adjustment of an ambient condition trigger value which indicates an ambient condition which triggers an adjustment in a level of illumination provided by the luminaire; or a retrieval of luminaire specific information.

To cause an adjustment in a level of illumination provided by the at least one luminaire the instructions may include at least one command to turn at least one solid-state light source of the luminaire ON or OFF. To cause the adjustment of a real time clock of the at least one luminaire the at least one processor may cause the transceiver to transmit at least one of a date, a current time, and/or a time zone of installation of the luminaire. The instructions may cause the handheld computing device to collect information from an external source to adjust the real time clock of the luminaire. The external source that the handheld computing device collects information from may be one of a cellular communications network or a Wi-Fi® server, or a global position system. The instructions may cause the general purpose handheld computing device to pair with a respective transceiver of a single luminaire at a time. The instructions may cause the general purpose handheld computing device to pair with a respective transceiver of each of a plurality of luminaires concurrently The instructions may cause the general purpose computing device to pair with a respective transceiver of each of a plurality of luminaires sequentially. The general purpose handheld computing device may take the form of a smartphone, a tablet, a netbook or laptop computer and the transceiver may be at least one of a Wi-Fi® or Bluetooth® transceiver. Alternatively, a fob or similar handheld device including a housing, at least one user operable actuator carried by the housing, at least one antenna carried by the housing, at least one transmitter received in the housing and communicatively coupled to the at least one antenna to provide wireless, non-line-of-sight communications to each of the luminaires; and at least one controller received in the housing and communicatively coupled to the at least one transmitter and operable responsive to user actuation of the at least one actuator to cause the transmitter to transmit signals via the non-line-of-sight communication which cause the luminaires to at least one of turn on or turn off the solid state light source if the luminaires are within wireless range of the device may be provided.

The instructions may cause the at least one processor to provide an interface that allows selection of a single one of a plurality of luminaires within range of the transceiver. The instructions may cause the at least one processor to provide an interface that allows selection of at least two of a plurality of luminaires for concurrent operation when the selected luminaires are within range of the transceiver. The instructions may cause the at least one processor to provide a user interface that allows selection of at least two of a plurality of luminaires to each send a same command. The instructions may cause the at least one processor to cause the transmitter to transmit commands to each of the selected luminaires as the general purpose handheld computing device comes within range of the respective luminaires. The instructions may cause the at least one processor to cause the transmitter to transmit commands that cause a firmware of the luminaire to be updated. The at least one processor may track time and the instructions may cause the at least one processor to cause the transmitter to transmit commands to selected ones of the luminaires at defined times. The instructions may cause the at least one processor to encrypt communications to the at least one luminaire and to decrypt communications from the at least one luminaire.

The general purpose handheld computing device may further include a global positioning transceiver that produces location information indicative of a present location of the general purpose handheld computing device, and wherein the at least one processor stores geographic location information logically associated with a set of luminaire specific information. The at least one processor may store the geographic location information logically associated with luminaire specific information in the form of a map of a lighting system. Responsive to a retrieval of luminaire specific information, the general purpose handheld computing device may receive at least one of a functional state of an ambient light sensor, an indication indicative of a presently configured dimming power level, a luminaire specific unique identifier, a length of time the luminaire has been in service, or an indication of an operating condition state.

A method of operation of a general purpose handheld computing device may be summarized as including at least one antenna, at least one transceiver communicatively coupled to the at least one antenna, a number of user input elements, at least one processor communicatively coupled to the at least one transceiver, a number of user input elements, and at least one non-transitory storage medium communicatively coupled to the at least one processor and which stores processor executable instructions, the method including creating a first group logical association between two or more luminaires to form a first set from all available luminaires for common configuration of the two or more luminaires in the first set; transmitting signals via the transceiver, the signals including configuration information to the luminaires in the first set of luminaires; and responsive to successful receipt of the configuration information by a luminaire within the first set, receiving via the transceiver a unique acknowledgement message broadcast by the luminaire.

The method of operation of a general purpose handheld computing device may further include, responsive to the receipt of the unique acknowledgement message broadcast by the luminaire, determining via the processor the luminaires within the first set that have received the configuration information; and repeating the transmitting signals via the transceiver, the signals including configuration information to the luminaires in the first set of luminaires until either of receipt of the transmitting signals which include configuration information by all of the luminaires in the first set or loss of the transmitting signal by all of the luminaires in the first set.

The method of operation of a general purpose handheld computing device may further include determining via the processor a subset of luminaires of the first group which are within a communications range of the general purpose handheld computing device at a first time; transmitting signals via the transceiver only to the subset of luminaires of the first group, the signal including configuration information; and transmitting via the transceiver to other luminaires of the first group as the other luminaires fall within the communications range of the general purpose handheld computing device at a second time, as a relative position of the general purpose handheld computing device changes with respect to the other luminaires. Transmitting signals to the luminaires in the first group may include transmitting signals to all luminaires in the first subset concurrently. Transmitting signals to the luminaires in the first group may include transmitting signals only to luminaires in the first group that are currently within range of the general purpose handheld computing device.

The method of operation of a general purpose handheld computing device may further include, responsive to the receipt of the unique acknowledgement message broadcast by the luminaire, identifying other luminaires of the first group that have not yet received the configuration information.

The method of operation of a general purpose handheld computing device may further include, responsive to the identification of the other luminaires of the first group that have not yet received the configuration information, transmitting configuration information to the other luminaires within the first group identified as not yet having received the configuration information.

The method of operation of a general purpose handheld computing device may further include retrieving the configuration information from each of the luminaires within the first group; comparing the retrieved configuration information with the current configuration loaded into the memory of the general purpose handheld computing device; and transmitting the current configuration from the memory of the general purpose handheld computing device to each of the luminaires within the first group identified as having configuration information different from the current configuration information.

The method of operation of a general purpose handheld computing device may further include displaying via the processor, the subset of luminaires on a map displayed on the general purpose handheld computing device, the display of each of the luminaires on the map spatially corresponding to a selective physical positioning of each of the luminaires within the subset of luminaires, and the position and identity of the luminaires may also be transmitted to a central database.

The method of operation of a general purpose handheld computing device may further include, responsive to the receipt via the transceiver of the unique acknowledgement message broadcast by the luminaire, visually indicating on the map those luminaires having received configuration information.

The method of operation of a general purpose handheld computing device may further include identifying a single luminaire to receive the current configuration information responsive to an input provided to the general purpose handheld computing device.

The method of operation of a general purpose handheld computing device may further include identifying a plurality of luminaires to receive the current configuration information responsive to an input provided to the general purpose handheld computing device.

The method of operation of a general purpose handheld computing device may further include determining via the processor one or more geographic locations placing the greatest number of luminaires within the subset in range of the general purpose handheld computing device; and providing a visual indication of the one or more geographic locations on the map displayed on the general purpose handheld computing device.

The method of operation of a general purpose handheld computing device may further include determining via the processor a minimum number of geographic locations to place all of the luminaires in the subset in range of the general purpose handheld computing device; and providing a visual indication of the geographic locations on the map displayed on the general purpose handheld computing device.

A method of operation of a general purpose handheld computing device which includes at least one antenna, at least one transceiver communicatively coupled to the at least one antenna, a number of user input elements, at least one processor communicatively coupled to the at least one transceiver, a number of user input elements, and at least one non-transitory storage medium communicatively coupled to the at least one processor and which stores processor executable instructions, may be summarized as including creating a first group logical association between two or more luminaires which form a first set of all available luminaires for common configuration of the two or more luminaires in the first set; creating a second group logical association between two or more luminaires which form a second set of all available luminaires for common configuration of the two or more luminaires in the second set, the second set not coextensive with the first set; transmitting signals via the transceiver, the signals to include configuration information to the luminaires in the first set of luminaires; and transmitting signals via the transceiver, the signals to include configuration information to the luminaires in the second set of luminaires.

Transmitting signals to the luminaires in the first group may include transmitting signals to all luminaires in the first set concurrently; and transmitting signals to the luminaires in the second group may include transmitting signals to all luminaires in the second set concurrently. Transmitting signals to the luminaires in the first group may include transmitting signals to all luminaires in the first set sequentially; and transmitting signals to the luminaires in the second group may include transmitting signals to all luminaires in the second set sequentially. Transmitting signals to the luminaires in the first group may include transmitting signals only to luminaires in the first set that are currently within range of the general purpose handheld computing device; and transmitting signals to the luminaires in the second group may include transmitting signals only to luminaires in the second set that are currently within range of the general purpose handheld computing device.

The method of operation of a general purpose handheld computing device which includes at least one antenna, at least one transceiver communicatively coupled to the at least one antenna, a number of user input elements, at least one processor communicatively coupled to the at least one transceiver, a number of user input elements, and at least one non-transitory storage medium communicatively coupled to the at least one processor and which stores processor executable instructions, may further include determining via the processor a first subset of luminaires of the first group which are within a communications range of the general purpose handheld computing device at a first time; determining via the processor a second subset of luminaires of the second group which are within the communications range of the general purpose handheld computing device at the first time; transmitting signals via the transceiver, the signals including configuration information only to the first subset of luminaires; transmitting signals via the transceiver, the signals including configuration information only to the second subset of luminaires; transmitting to other luminaires of the first set as the other luminaires fall within the communications range of the general purpose handheld computing device at a second time, as a relative position of the general purpose handheld computing device changes with respect to the other luminaires in the first set; and transmitting to other luminaires of the second set as the other luminaires fall within the communications range of the general purpose handheld computing device at the second time, as the relative position of the general purpose handheld computing device changes with respect to the other luminaires in the second set.

The method of operation of a general purpose handheld computing device which includes at least one antenna, at least one transceiver communicatively coupled to the at least one antenna, a number of user input elements, at least one processor communicatively coupled to the at least one transceiver, a number of user input elements, and at least one non-transitory storage medium communicatively coupled to the at least one processor and which stores processor executable instructions, may further include, responsive to successful receipt of the configuration information by a luminaire within the first set, receiving via the transceiver a unique acknowledgement message broadcast by the luminaire; responsive to successful receipt of the configuration information by a luminaire within the second set, receiving via the transceiver a unique acknowledgement message broadcast by the luminaire; responsive to the receipt of the unique acknowledgement message from the luminaire within the first set, identifying via the processor other luminaires of the first group that have not yet received the configuration information; and responsive to the receipt of the unique acknowledgement message from the luminaire within the second set, identifying via the processor other luminaires of the second group that have not yet received the configuration information.

The method of operation of a general purpose handheld computing device which includes at least one antenna, at least one transceiver communicatively coupled to the at least one antenna, a number of user input elements, at least one processor communicatively coupled to the at least one transceiver, a number of user input elements, and at least one non-transitory storage medium communicatively coupled to the at least one processor and which stores processor executable instructions, may further include transmitting configuration information via the transceiver to the other luminaires within the first group identified as not yet having received the configuration information; and transmitting configuration information via the transceiver to the other luminaires within the second group identified as not yet having received the configuration information.

The method of operation of a general purpose handheld computing device which includes at least one antenna, at least one transceiver communicatively coupled to the at least one antenna, a number of user input elements, at least one processor communicatively coupled to the at least one transceiver, a number of user input elements, and at least one non-transitory storage medium communicatively coupled to the at least one processor and which stores processor executable instructions, may further include, responsive to the receipt of the unique acknowledgement message broadcast by the luminaire in the first group, determining the luminaires within the first set that have received the configuration information; responsive to the receipt of the unique acknowledgement message broadcast by the luminaire in the second group, determining the luminaires within in the second set that have received the configuration information; repeating the transmitting signals which include configuration information to the luminaires in the first set of luminaires until either of receipt of the transmitting signals which include configuration information by all of the luminaires in the first set or loss of the transmitting signal by all of the luminaires in the first set; and repeating the transmitting signals which include configuration information to the luminaires in the first set of luminaires until either of receipt of the transmitting signals which include configuration information by all of the luminaires in the second set or loss of the transmitting signal by all of the luminaires in the second set.

The method of operation of a general purpose handheld computing device which includes at least one antenna, at least one transceiver communicatively coupled to the at least one antenna, a number of user input elements, at least one processor communicatively coupled to the at least one transceiver, a number of user input elements, and at least one non-transitory storage medium communicatively coupled to the at least one processor and which stores processor executable instructions, may further include displaying the subset of luminaires within the first group on a map displayed on the general purpose handheld computing device, the map spatially corresponding to the physical positioning of each of the first set of luminaires; and displaying the subset of luminaires within the second group on a map displayed on the general purpose handheld computing device, the map spatially corresponding to the physical positioning of each of the second set of luminaires.

The method of operation of a handheld device to control a plurality of luminaires is also provided. The handheld device includes a housing, at least one user operable actuator carried by the housing, at least one antenna carried by the housing, at least one transmitter received in the housing and communicatively coupled to the at least one antenna to provide wireless, non-line-of-sight communications to each the luminaires, and at least one controller received in the housing and communicatively coupled to the at least one transmitter and operable responsive to user actuation of the at least one actuator to cause the transmitter to transmit signals via the non-line-of-sight communication. Signals are transmitted from the handheld device to each of the luminaires within range of the handheld device responsive to actuation of the at least one actuator. The signals can cause each luminaire to at least one of: turn on a solid state light source within the respective luminaire and turn off the solid state light source within the respective luminaire.

One or more security codes may be used to provide secure communications between the handheld device and each of the luminaires. The security codes may include one or more of: a code associated with the user of the handheld device; a code uniquely associated with each of the luminaires; a code commonly associated with all of the luminaires; and a code associated with a geographic location of each of the luminaires Each of the luminaires may acknowledge connection to and disconnection from the handheld device. The at least one luminaire may provide a unique visual indication responsive to forming the non-line-of-sight wireless connection with the handheld device. The at least one luminaire may also provide a second unique visual indication responsive to closing the non-line-of-sight wireless connection with the handheld device. The memory within the luminaire may also store historical data associated with the handheld devices or general purpose handheld computing devices that have made a non-line-of-sight wireless connection to the luminaire.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with lighting systems, for example power converters, thermal management structures and subsystems, and/or solid state lights have not been described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

Figure 1:
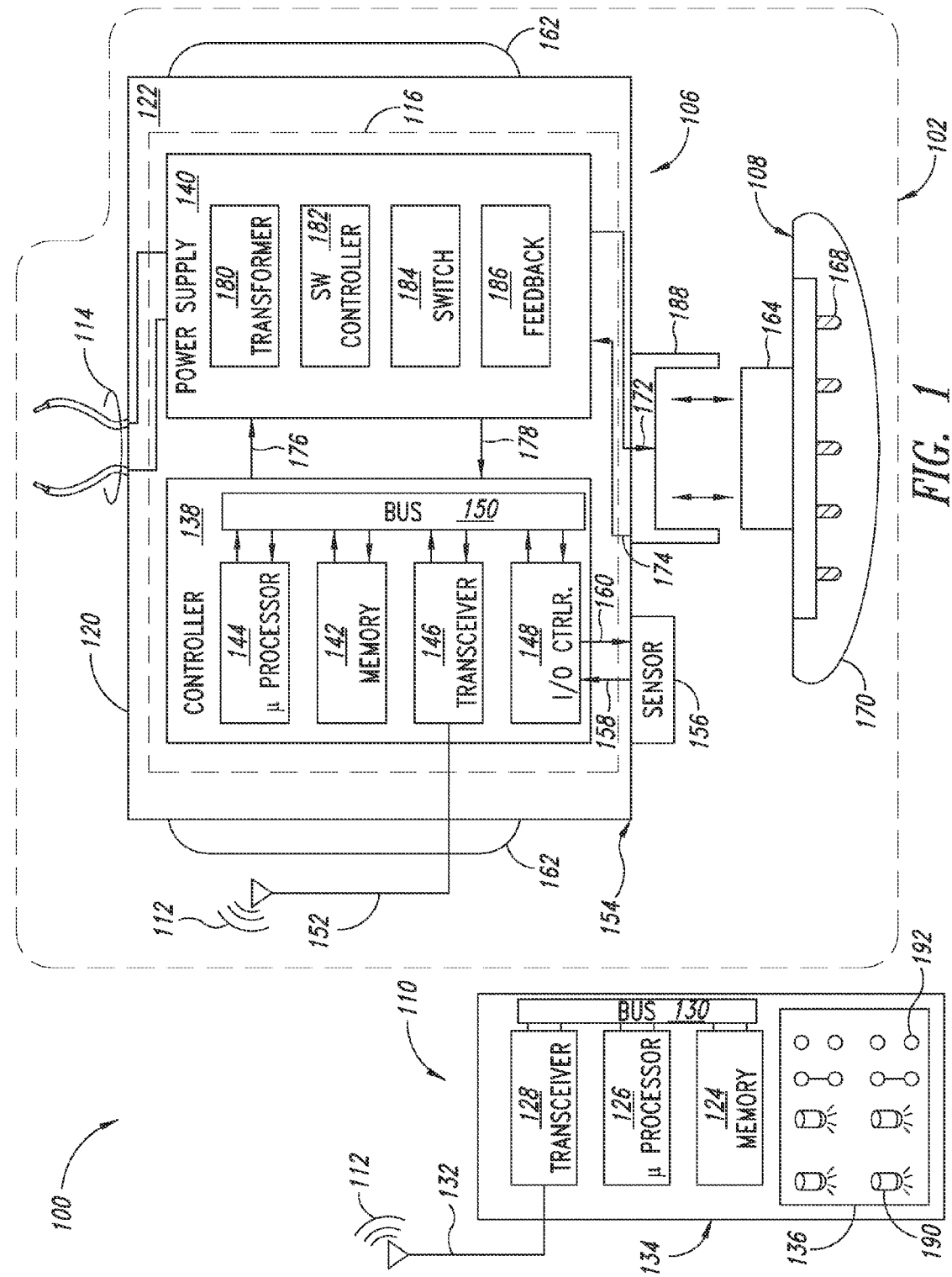
FIG. 1 is a functional block diagram of a lighting system including a modular luminaire and a general purpose handheld computing device, according to one illustrated embodiment.

FIG. 1 shows a lighting system 100 including a luminaire 102 comprising a control unit 106 and a removable or replaceable solid state lamp 108 and a general purpose handheld computing device 110 that is capable of communicating with the control unit 106 via one or more non-line-of-sight (non-LOS) wireless signals 112. The luminaire 102 can be coupled to an electrical power supply via one or more conductors 114 and can include one or more electrical devices or systems, for example driver electronics 116 coupled to the electrical power supply. A housing 120 can define an interior 122 into which the driver electronics 116 can be at least partially disposed such that the housing 120 provides a degree of protection from the ambient environment for the driver electronics 116.

The general purpose handheld computing device 110 can include, among other things, at least one non-transitory processor-readable medium or memory 124, at least one microprocessor 126, and at least one transceiver 128 that are communicably coupled to each other via one or more conductive pathways, for example via a series or parallel data bus 130. The general purpose handheld computing device 110 also includes at least one user interface 136. The general purpose handheld computing device 110 can include any portable computing device having a microprocessor, memory, and at least one transceiver including, but not limited to, cellular telephones, smart phones, handheld or tablet computers, personal digital assistants, ultraportable computers and the like.

The memory 124 can at least include a non-volatile storage memory, and in some embodiments may also include a volatile memory as well. At least a portion of the memory 124 is used to store one or more machine executable instruction sets for execution by the microprocessor 126. In some embodiments, all or a portion of the memory 124 may be disposed within the microprocessor 126, for example in the form of a cache. In some embodiments, the memory 124 may additionally include non-volatile memory in the form of electromagnetic storage (e.g. a rotating hard disk drive), electrostatic storage (e.g. a solid state drive) or any combination thereof. In some embodiments, the memory 124 may be supplemented with one or more slots configured to accept the insertion of one or more removable memory devices such as a secure digital (SD) card, a compact flash (CF) card, a universal serial bus (USB) memory "stick", or the like.

The microprocessor 126 includes any type of processor adapted to execute one or more machine executable instruction sets, for example a conventional microprocessor, a reduced instruction set computer (RISC) based processor, an application specific integrated circuit (ASIC), or similar.

Within the microprocessor 126, a non-volatile memory may store all or a portion of a basic input/output system (BIOS), boot sequence, firmware, startup routine, and/or operating system executed by the microprocessor 126 upon initial application of power to the microprocessor 126. The microprocessor 126 may also execute one or more machine executable instruction sets loaded from the memory 124 subsequent to the initial application of power to the microprocessor 126. The microprocessor 126 may also include a system clock, a calendar, or similar time measurement devices.

The transceiver 128 can include any system or device suitable for communicating via one or more non-line-of-sight ("non-LOS") signals (e.g. radio frequency signals) with a remote device using at least one industry standard or non-standard signal protocols. In some embodiments, the transceiver 128 may use an encrypted or secure communications protocol, method, or channel to minimize the likelihood of unauthorized access to the transceiver 128 or a remote device (e.g. luminaire 102) communicably coupled to the transceiver 128 via the one or more non-LOS wireless signals 112. In some embodiments, for example where all or a portion of the non-LOS wireless signals 112 are provided in analog format, the transceiver 128 may include at least one analog-to-digital converter ("ADC") to convert incoming analog non-LOS wireless signals 112 to a digital format. Similarly, the transceiver 128 may include at least one digital-to-analog converter ("DAC") to convert outgoing digital non-LOS wireless signals 112 to analog format. In at least some embodiments, the transceiver 128 may contain a media access control ("MAC") address uniquely identifying the transceiver 128 and/or general purpose handheld computing device 110.

In operation, the transceiver 128 transmits non-LOS wireless signals 112, containing at least in part commands, instructions, and/or data provided by a user via the user interface 136. The non-LOS wireless signals 112 are broadcast using an antenna 132 coupled to the transceiver 128. At least a portion of the antenna 132 may be exposed on the exterior surface 134 of the general purpose handheld computing device 110.

The non-LOS wireless signals 112 generated by the transceiver 128 can be encoded using one or more industry standard protocols such as IEEE 802.11, near field communication ("NFC"), Bluetooth, or the like. Alternatively, the non-LOS wireless signals 112 may be encoded using a proprietary or closed signal protocol. In at least one embodiment, the transceiver 128 may be configured to encrypt outgoing non-LOS wireless signals and decrypt incoming non-LOS wireless signals. Use of an industry standard signal encoding may advantageously permit the use of devices such as cellular telephones, tablet computers, ultraportable computers, and the like since those devices are frequently equipped with IEEE 802.11, NFC, and/or Bluetooth compatible transceivers. Alternatively, the luminaire manufacturer may make available a non-standard or proprietary communications protocol by supplying a dedicated application, for example on a computer readable medium, or by providing online access to the application for example through an Applications Marketplace such as the Apple®AppStore.

The bus 130 bi-directionally and communicably couples the memory 124, microprocessor 126, and transceiver 128 to each other. The bus 130 can include one or more serial communications links or a parallel communications link such as an 8-bit, 16-bit, 32-bit, or 64-bit data bus. In some embodiments, a redundant bus (not shown) may be present to provide failover capability in the event of a failure or disruption of the primary bus 130.

The general purpose handheld computing device 110 also contains one or more user interfaces 136 permitting user entry of data including, for example, luminaire configuration data, luminaire identification data, luminaire software or firmware updates, a desired intensity, illumination schedule or combinations thereof, and may be automatically loaded from another computer. Using the general purpose handheld computing device 110, data is communicated in the form of one or more non-LOS wireless signals 112 to the luminaire 102. The one or more user interfaces 136 can include one or more keypads, buttons, switches, knobs, tactile input devices, keyboards, pointers, touch pads or combinations thereof to facilitate the entry of commands by the user. Commands and/or data entered by the user can be stored within the memory 124 and communicated at the direction of the microprocessor 126 to one or more remote devices such as the luminaire 102 via the transceiver 128.

The user interface 136 may employ one or more data input devices or systems. In one example, the user interface 136 may include only a single input device such as a touchpad, or even one or more user selectable switches or actuators, while in other instances the user interface 136 may include a plurality of input devices, for example a touchscreen input device and a conventional or virtual keypad or keyboard such as those found on many small form factor electronic devices.

In some embodiments, the user interface 136 may comprise a touchscreen such as that depicted in FIG. 1. The touchscreen can include any type of touchscreen entry device including, but not limited to, a resistive touchscreen or a capacitive touchscreen. Individual icons 190 and controls 192, for example virtual buttons or slider controls that are both intuitive and useful for communicating instructions, commands, and data to the luminaire 102 may be displayed on the touchscreen user interface 136. In some embodiments, for example where a plurality of luminaires 102 are disposed within a defined geographic area such as a commercial space, auditorium, parking lot or the like, all or a portion of the plurality of luminaires 102 may be displayed on the touchscreen user interface 136. In at least some embodiments, the global positioning system ("GPS") functionality provided on some general purpose handheld computing devices 110 may be integrated into the display, thus depicting the plurality of luminaires 102 in a spatially or geographically accurate manner on the touchscreen user interface 136.

Advantageously, the ability to display a number of luminaires 102 on the touchscreen enables the user the option to selectively control an individual luminaire 102 or to selectively place individual luminaires 102 into one or more groups and then provide common configuration information applicable across the entire group of luminaires 102. For example, luminaires above a parking lot may be allocated into one of two logically associated groups each group containing a portion of the total number of luminaires 102. The first group may be proximate a retail store while the second group lies remote from the retail store. The intensity of the luminaires within the first group may be increased to maximum (e.g. 100% output) as a crime deterrent measure while the intensity of the second group may be decreased slightly (e.g. 60% output) as an energy conservation measure. Importantly, the ability to group the luminaires 102 into logically associated groups permits the manual entry of configuration information for only two groups rather than requiring the manual entry of configuration information for each luminaire 102 within the parking lot.

Many general purpose handheld computing devices 110 are equipped with native GPS capabilities and integration of GPS data into the user interface 136, particularly a graphical user interface, may provide additional functionality. For example, the user interface 136 may display a map designating a plurality of geographic points from which the maximum number of luminaires 102 are within range of the transceiver 128. In another embodiment, the touchscreen can visually indicate which of a plurality of luminaires 102 are within immediate range of the transceiver 128, for example by visually distinguishing those luminaires 102 within range of the transceiver 128 from those luminaires out of range of the transceiver 128.

Referring now to the luminaire 102, the driver electronics 116 can include, among other things, at least one controller 138 and at least one power supply 140. The controller 138 provides the capability for a user to communicate with the luminaire 102 via one or machine executable instruction sets executed on the general purpose handheld computing device 110. The controller 138 includes at least a memory 142, microprocessor 144, transceiver 146, and I/O controller 148 that are communicably coupled to each other via one or more conductive pathways, for example via a series or parallel data bus 150. The transceiver 146 can transmit and receive one or more digital and/or analog non-LOS wireless signals 112 via an antenna 152. At least a portion of the antenna 152 may be exposed on an exterior surface 154 of the housing 120. In some embodiments, one or more sensors 156 disposed on or about the surface of the housing 106 are communicably coupled 158, 160 to the I/O controller 148.

The controller 138 forms at least a portion of the driver electronics 116. The microprocessor 144 can execute one or more machine executable instruction sets or machine executable routines to alter, adjust, or control one or more functional aspects of the luminaire 102. Example functional aspects can include, but are not limited to, the intensity of the lamp 108, the schedule of operation of the lamp 108, or the like. Although the various logical elements within the controller 138 are depicted in FIG. 1 as being discrete, two or more logical elements may be combined to provide a multifunction device, for example the microprocessor 144 can, in some instances, include an on-board I/O controller 148 and/or transceiver 146.

The housing 120 may be manufactured or formed from metal, composites, or the like. If formed from metal, one or more decorative and/or protective coatings may be applied to at least a portion of the exterior surface 154 of the housing 120. In some instances, the housing 120 may be powder coated or anodized to minimize corrosion of the underlying base metal structure. The driver electronics 116 are positioned at least partially within the interior 122 of the housing 120 to minimize exposure of the driver electronics 116 to potentially corrosive or other detrimental environmental conditions. In some instances the housing 120 may be hermetically sealed to prevent the incursion of liquids or solids.

The driver electronics 116 will generate heat during routine operation. Heat buildup in the interior 122 of housing 120 can shorten the life and adversely affect the performance of the driver electronics 116. To assist in conveying or otherwise transferring heat from the housing 120 to the surrounding ambient environment, one or more extended surface features 162 (e.g. fins) may be disposed on the exterior surface 154 of the housing 120.

Additionally, although not depicted in FIG. 1, the housing 120 may include one or more slots, openings, or apertures formed therein which are configured to decrease or regulate the temperature of the interior 138 of the housing 120 as well as the temperature of the housing 120 itself. The slots, openings, or apertures can be arranged or configured to facilitate the egress of relatively warm air from within the housing 120 and/or the ingress of relatively cool ambient air into the housing 120.

The driver electronics 116 may be thermally coupled to the housing 120 to facilitate the transmission of heat from the driver electronics 116 to the housing 120. For example, the housing 120 may be adapted to receive a heat sink in the form of a thermally conductive plate or block to which the driver electronics 116 may be physically and/or thermally conductively coupled.

The luminaire 120 is electrically coupled to the electrical system using any one of a number of electrical coupling devices; examples include an Edison screw base, a bayonet base, or as depicted in FIG. 1, by hard wiring the one or more conductors 114 directly to the electrical distribution system. In some embodiments, the luminaire 120 may be supported in whole or in part by the electrical coupling device, for example when an Edison screw base or bayonet base are used. In other embodiments, the luminaire 120 may be supported in whole or in part by a structure external to the electrical coupling device used to attach the luminaire 120 to the electrical power distribution system.

The lamp 108 includes one or more solid state light systems 164 incorporating any number of individual solid state light sources 168. The light sources 168 can, in some instances, be at least partially enclosed or covered by a lens 170. The lens 170 may be plastic, glass, or the like and is transmissive over at least a portion of the visible light spectrum. The lens 170 may have a nadir surface with a shape that is convex, concave, or approximately flat. Additionally, the lens 170 may include or form a color filter that is operable to adjust the color temperature of light emitted by the solid-state light sources 168. The lens 170 may detachably couple to the lamp 108 so that lenses having different shapes and transmission characteristics may be interchangeably coupled to the lamp 108.

The solid-state light sources 168 are positioned such that at least a portion of the visible light generated by the solid state light sources 168 passes through the lens 170. In some instances, the solid-state light sources 168 may include one or more light emitting diodes (LEDs). The LEDs may be one of any of a variety of LEDs, such as phosphor-based LEDs, organic LEDs (OLEDs), or the like. The LEDs may be electrically coupled together in series, in parallel, or in a combination of electrical series and parallel to form a string of LEDs. The solid-state light sources 168 receive power from the driver electronics 116 via the electrically conductive path 172 and provide feedback to the driver electronics 116 via the electrically conductive return path 174.

One or more sensors 156 may be physically and electrically coupled to the housing 120. In at least some instances, the one or more sensors 156 may influence, control or affect at least one functional aspect of the luminaire 102. The one or more sensors 156 can provide one or more analog or digital signals 158 to the I/O controller 148. In at least one instance, the one or more sensors 156 can be, for example a photocell or similar photoelectric or photovoltaic device capable of providing one or more analog and/or digital signals proportionate to the quantity or intensity of light incident upon the sensor 156. In some instances, the I/O controller 156 may provide at least a portion of the power 160 to the one or more sensors 156.

In some embodiments, the one or more sensors 156 provide an analog signal proportionate to the intensity of the light incident upon the one or more sensors 156. The analog signal proportionate to incident light intensity may be useful, for example, in controlling the intensity of the luminaire 102 in inverse proportion to the intensity of the ambient light falling on the one or more sensors 156. In some instances an analog signal provided by the one or more sensors 156 may be converted to a digital signal, for example through the use of an ADC converter within the I/O controller 148. In some instances, the intensity signal may be communicated to the processor 144 across the bus 150. Within the processor 144 one or more machine executable instruction sets may be executed to further control the output and/or intensity of the lamp 108.

In another instance the one or more sensors 156 provide a digital signal proportionate to the intensity of the light incident upon the one or more sensors 156. Such a digital signal can be communicated by the I/O controller 148 directly to the processor 144 across the bus 150. Within the processor 144 one or more machine executable instruction sets may be executed to further control the output and/or intensity of the lamp 108.

The microprocessor 144 includes any type of processor adapted to execute one or more machine executable instruction sets, for example a conventional microprocessor, a reduced instruction set computer (RISC) based processor, an application specific integrated circuit (ASIC), or similar. Within the microprocessor 144, a non-volatile memory may store all or a portion of a basic input/output system (BIOS), boot sequence, firmware, or startup routine executed by the microprocessor 144 upon initial application of power to the microprocessor 144. The microprocessor 144 may also execute one or more instruction sets loaded from the memory 142 subsequent to the initial application of power to the microprocessor 144. One or more timers, for example countup or count-down timers may be disposed within the microprocessor 144. The microprocessor 144 may also include a system clock, a calendar, or similar time-based measurement devices. In at least some embodiments, the system clock and calendar are stored in volatile memory 142 and are updated upon establishment of non-LOS based communication 112 with the general purpose handheld computing device 110. In at least some embodiments, the microprocessor 144 contains a non-volatile data sequence uniquely identifying the microprocessor 144 and the corresponding luminaire 102 in which the microprocessor 144 resides.

The microprocessor 144 may validate one or more identifiers or codes carried by the non-LOS wireless signal 112 received by the transceiver 146. The microprocessor 144 may compare the one or more identifiers or codes against authorization or identification data stored in the memory 142. The authorization or identification data may be programmed into the memory 142 either at the time of manufacture or subsequently by the user, for example during the initial configuration of the luminaire 102 by the user. The microprocessor 144 may be configured to ignore any instructions received by the transceiver 146 until the one or more identifiers or codes carried by the non-LOS wireless signal 112 matches with or are authenticated by the authorization of identification data stored in the memory 142. In other instances, the communications protocol used to couple the transceiver 128 in the general purpose handheld computing device 110 with the transceiver 146 in the luminaire 102 may include a native security protocol, for example the Bluetooth device pairing protocol which serves to authenticate the general purpose handheld computing device 110 with the luminaire 102.

In at least some embodiments, responsive to the successful receipt and storage of one or more commands or data by the controller 138, the microprocessor 144 causes the transceiver 146 to broadcast a confirmation or acknowledgement of receipt message to the general purpose handheld computing device 110. The acknowledgement message may include one or more identifiers uniquely identifying the luminaire 102, the controller 138, and/or the processor 144.

The microprocessor 144 may communicate commands or data from the controller 138 to the power supply 140 in several ways. In some instances, the controller 138 may be communicably coupled to the power supply 138 via the communication links 176, 178. Responsive to a received command or data, the microprocessor 144 may transmit or adjust an analog signal on the outbound communication link 176. For example, the microprocessor 144 may cause a voltage increase or decrease on the outbound communication link 176 in response to adjustment instructions to increase or decrease the intensity of the solid state light system 164, respectively. Alternatively, the microprocessor 144 may transmit light intensity commands to the power supply 140 via the outbound communication link 176 in the form of one or more digital signals. The controller 138 may receive acknowledgment from the power supply 140 via the inbound communication link 178 acknowledging receipt of the commands or data by the power supply 140.

When the luminaire 102 is initially powered, the microprocessor 144 may retrieve initial or default configuration data from a non-volatile portion of the memory 142. The microprocessor 144 may then output an analog or digital signal to the power supply 140 corresponding to the retrieved configuration data, thereby setting the initial or default intensity of the solid-state light system 164. When the luminaire 102 receives a subsequent, valid, instruction to adjust the intensity of the solid-state light system 164, the microprocessor 144 may, in memory 142, overwrite the initial or default configuration with the newly received configuration data. The new configuration data stored in the memory 142 may then be used as the initial or default configuration upon subsequent power cycling to the luminaire 102.

The memory 142 can at least include non-volatile storage memory. In some embodiments, the memory 142 can also include volatile memory. At least a portion of the memory 142 is used to store one or more machine executable instruction sets executable by the microprocessor 144. At least one of the machine executable instruction sets stored within the memory 142 is a machine executable instruction set provided by a user via the general purpose handheld computing device 110. In some instances, multiple machine executable instruction sets provided by the user via the general purpose handheld computing device 110 may be stored within the memory 142. In some embodiments, the memory 142 may be disposed in whole or in part within the microprocessor 144. In some instances at portion of the memory 142 may be immutable and contain data provided by the manufacturer to uniquely identify the luminaire 102. At least a non-volatile portion of the memory 142 may be programmed by the luminaire manufacturer to include access identifiers, adjustment instructions, and/or default settings for other user-customizable features. The luminaire 102 may log an identification number or code into the memory 142 to maintain a record of which devices have accessed the luminaire 102 to aid in controlling system security.

In some embodiments, the memory 142 can include one or more slots or adapters configured to accept the insertion of one or more user supplied memory devices such as a secure digital (SD) card, a compact flash (CF) card, a universal serial bus (USB) memory "stick", or the like.

The transceiver 146 can include any device suitable for communicating with a remote device via one or more non-LOS wireless (e.g., radio or microwave carrier frequency) open or closed protocol signals. In some embodiments, the transceiver 146 can be a single or multi-channel device able to communicate with the general purpose handheld computing device 110 transceiver 128 using one or more industry standard protocols such as IEEE 802.11 ("WiFi") protocol, Bluetooth protocol, or any other industry standard signal protocol. In other embodiments, the transceiver 146 can be a single or multi-channel device able to communicate with the transceiver 128 within the general purpose handheld computing device 110 via proprietary, or non-standard signal protocols, for example a proprietary wireless protocol supplied by the manufacturer of the transceiver 146, controller 138, or luminaire 102. In at least one embodiment, the transceiver 128 may be configured to encrypt outgoing non-LOS wireless signals 112 and decrypt incoming non-LOS wireless signals 112.

In some embodiments, the transceiver 128 in the general purpose handheld computing device 110 and the transceiver 146 in luminaire 102 can use an encrypted or secure communications method or channel to minimize the likelihood of unauthorized access to the luminaire controller 138. Where all or a portion of the non-LOS wireless signals 112 are provided in analog format, the transceiver 146 may include an ADC to convert incoming analog non-LOS wireless signals 112 to a digital format. Similarly, the transceiver 146 may include a DAC to convert outgoing digital non-LOS wireless signals 112 to analog format. In at least some embodiments, the transceiver 146 contains a media access control ("MAC") address or similar identifier uniquely identifying the transceiver 146 and/or the luminaire 102.

In at least some embodiments, the transceiver 146 and the microprocessor 144 may be configured to provide signal repeater functionality useful in rebroadcasting data received from the general purpose handheld computing device 110 to other nearby luminaires 102. For example, when configured to provide signal repeater functionality, a non-LOS wireless signal 112 received by the transceiver 146 can be communicated to the microprocessor 144. The microprocessor 144, in turn, can rebroadcast the data carried by the signal 112 either identically or in modified form to the transceiver 146 for retransmission. Where other uniquely addressable luminaires 102 are proximate, the microprocessor 144 may modify the non-LOS wireless signal 112, for example by adding data such as an identifier to designate one or more particular luminaires 102 as intended recipients of the retransmitted message.

The input/output controller 148 can include any device suitable for receiving and transmitting one or more signals to an external or internal device coupled to the I/O controller 148. In at least some embodiments, one or more ADCs may be disposed within the I/O controller 148 to receive an analog signal from one or more sensors 156 and transmit a digital signal to the bus 150. In at least some embodiments, one or more DACs may be disposed within the I/O controller 148 to receive a digital signal from the bus 150 and transmit an analog signal to one or more sensors 156.

The bus 150 bi-directionally, communicably couples the memory 142, the microprocessor 144, the transceiver 146, and the I/O controller 148. The bus 150 can include one or more serial buses or one or more parallel buses such as an 8-bit, 16-bit, 32-bit, or 64-bit data bus. In at least some embodiments, the power supply 140 can communicate to the controller 138 via the bus 150, for example using the inbound and outbound communications links 176, 178, or through the use of one or more bi-directional links (not shown). In some embodiments, a redundant bus (not shown) may be present to provide failover capability in the event of a failure or disruption of the primary bus 150.

To accomplish at least a portion of the control of the lamp 108, the controller 138 can transmit and receive one or more signals to/from the power supply 140 via the inbound and outbound communications links 176, 178. The availability of bi-directional communication with the power supply 140 provides a high degree of integration, control and feedback between the power supply 140 and the controller 138 enabling reliable and flexible operation of the luminaire 102. In some embodiments, the bus 150 may be communicably coupled to the power supply 140 and the controller 138 may bi-directionally communicate with the power supply 140 via the bus 154.

The power supply 140 includes elements useful in powering the lamp 108 and the controller 138. The power supply may include one or more power transformer/converters 180, one or more switch controllers 182 coupled to one or more switches 184, and feedback circuitry 186 coupled to the solid state lighting system 164 via the socket 188 and the electrically conductive path and return path 172, 174. In at least some embodiments, the power supply 140 may be used to selectively and controllably vary the intensity of the solid-state lighting system 164.

The power supply 140 may vary the output intensity of the solid-state lighting system 164 by varying the duty cycle of the power signal to the solid-state lighting system 164, by selectively illuminating different numbers or patterns of solid-state light sources 168 (e.g., 15 LEDs at one time and 30 LEDs at another), or by varying the magnitude of current and/or voltage delivered to the solid-state light system 164.

The transformer/converter 180 is electrically coupled to the one or more conductors 114. The transformer/converter 180 may be configured to increase or decrease the incoming line voltage received from an external power grid via the conductors 114. In addition to adjusting the voltage of the incoming power, the transformer/converter 180 may also convert the incoming power supplied via the conductors 114 from an alternating current ("A.C.") line voltage to a different waveform, for example direct current ("D.C.") power suitable for supply to the controller 138 and/or the one or more solid state light systems 164. The electrically conductive path 172 electrically couples the transformer/converter 180 to the solid state lighting system 164. The transformer/converter 180 may provide more or less power to the one or more solid state lighting systems 164 based upon the duration and/or frequency with which current is permitted to flow through at least one winding of the transformer/converter 180.

The switch 184 may selectively control the flow of current through at least one winding of the transformer/converter 180. The switch 184 may include a metal oxide semiconductor field effect transistor (MOSFET), an insulated gate bipolar transistor (IGBT), or the like. The switch 184 may include a control terminal that is electrically coupled to be operated from the switch controller 182. The switch controller 182 may be configured to control the duration and frequency with which current flows through the at least one winding of the transformer/converter 180 by selectively operating the switch 184. The switch controller 182 may operate the switch 184 by transmitting a series of pulses to the control terminal of the switch 184. The switch controller 182 may vary the amplitude, duty cycle, and/or frequency of the series of pulses in response to the input received from the controller 138.

The switch controller 182 may have one or more inputs electrically coupled to the electrically conductive return path 174 to sense one or more parameters such as the voltage level on the electrically conductive return path 174. The switch controller 182 may increase or decrease the power output to the one or more solid state lighting systems 164 in response to respective increases and decreases in the level of voltage on the electrically conductive path 172. Specifically, the switch controller 182 may increase or decrease the duty cycle and/or frequency of the series of pulses transmitted to the switch 184 to increase or decrease, respectively, the power output by the transformer/converter 180.

The feedback circuitry 186 may provide information to the switch controller 182 that is indicative of an amount of power actually being supplied to or received by the one or more solid state lighting systems 164. The feedback circuitry 186 may be electrically coupled to the electrically conductive return path 174 to monitor the current or voltage supplied to the solid-state lighting system 164. The feedback circuitry 186 may be electrically coupled to the communications links 176, 178 and may be responsive to one or more signals provided by the controller 138 via the communication links 176, 178. In other words, the feedback circuitry 186 may increase or decrease the intensity of the solid-state light sources 168 by adjusting the feedback provided to the switch controller 182 based on one or more signals transmitted by the controller 138 via the communication links 176, 178.

Figure 2:
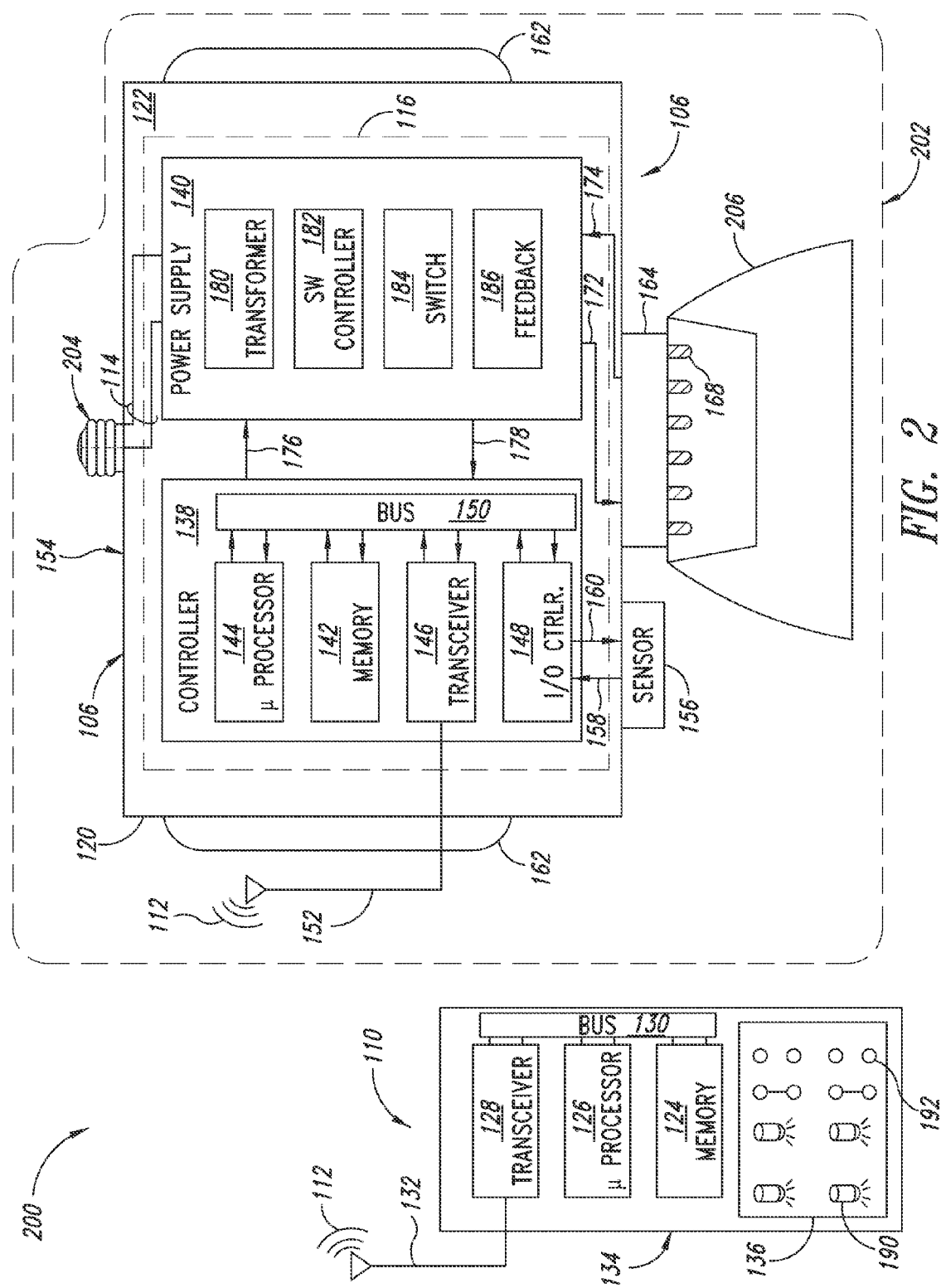
FIG. 2 is a functional block diagram of a lighting system including a unitary luminaire and a general purpose handheld computing device, according to one illustrated embodiment.

FIG. 2 is a functional block diagram of a lighting system 200 including a unitary luminaire 202 having an industry standard connector 204 and an integral reflector 206 disposed about a solid-state lighting system 164. In at least some instances, rather than the modular configuration depicted in FIG. 1, the luminaire 202 may be supplied as an integrated system with an industry standard connector 204 and an integral reflector 206. In some instances, the solid state lighting system 164 in luminaire 202 may be neither removable nor replaceable, while in other instances, the solid state lighting system 164 in luminaire 202 may be both removable and replaceable.

As depicted in FIG. 2, the conductors 114 may, in some embodiments, be electrically coupled to an industry standard connector 204. Although an Edison screw base is depicted in FIG. 2, any industry standard connector can be so employed and so used with the luminaire 202. In some instances, one or more specialty connectors 204, such as explosion proof or intrinsically safe connectors 204 may also be used. The industry standard connector is physically coupled to the housing 120 to provide a unitary, integrated structure.

Also depicted in FIG. 2 is an open type reflector 206 disposed about the solid state lighting system 164. Any number of lenses, reflectors, or combination of lenses and reflectors may be used to provide the desired level of illumination, illumination pattern, and/or illumination arc.

Figure 3:
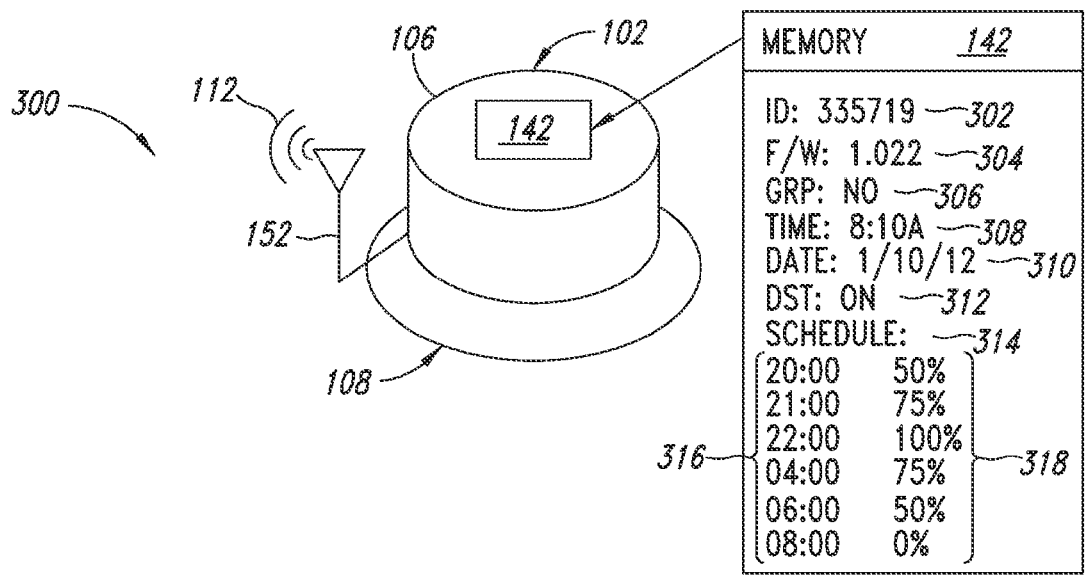
FIG. 3 is a perspective view of a lighting system including a single luminaire and a general purpose handheld computing device, according to one illustrated embodiment.
Figure 3:
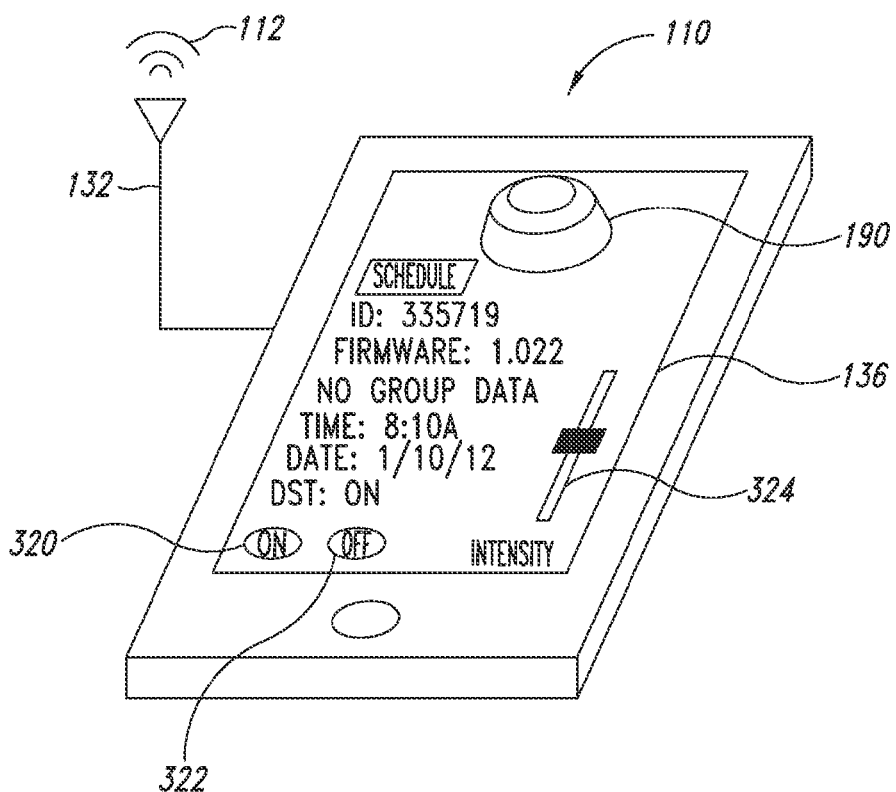

FIG. 3 is a perspective view of a lighting system 300 including a single luminaire 102 and a general purpose handheld computing device 110, according to one illustrated embodiment. Although depicting only a single luminaire 102 and general purpose handheld computing device 110 for clarity and ease of discussion, the description provided herein with reference to FIG. 3 can be extended to a lighting system comprising any number of luminaires 102.

Within the control unit 106 of luminaire 102 data is stored in the memory 142. The data within the memory 142 can include any physical, geographical, functional, configuration or similar data. Example data may include, but is not limited to: a unique identifier 302 that uniquely identifies the luminaire 102; the firmware version 304 onboard the luminaire 102; the group 306 associated with the luminaire 102; the current time 308, the current date 310; a daylight savings time indicator 312; and an illumination schedule 314. All or a portion of the data may be loaded into the memory 142 at the time of manufacture, for example to provide default data used by the luminaire 102 in the absence of user supplied data. All or a portion of the data may represent user data loaded into memory 142 subsequent to the manufacture of the luminaire 102.

The illumination schedule 310 provides a time-based illumination schedule for the luminaire 102 and may include tabular data including a time listing 316 and a respective illumination intensity level 318 associated with each time. For example, the illumination schedule 316, 318 depicted in FIG. 3, gradually increases the intensity of the luminaire from 0% to 50% at 20:00; from 50% to 100% at 22:00 and then gradually reduces the intensity of the luminaire back to 0% (i.e. "OFF") at 08:00.

A user may access the memory within the luminaire 102, for example by entering the luminaire identification code "3-3-5-7-1-9" into the general purpose handheld computing device 110. In other instances, once a general purpose handheld computing device 110 is paired with a luminaire 102, for example using a Bluetooth or similar pairing procedure, the general purpose handheld computing device 110 may automatically connect to the luminaire 102 once in range of the transceiver 146. Once a non-LOS wireless connection 112 is established, all or a portion of the data stored within the memory 142 of the luminaire 102 can be accessed, updated and/or overwritten by the user via the general purpose handheld computing device 110.

Upon establishment of the non-LOS wireless connection 112 between the luminaire 102 and the general purpose handheld computing device 110, all or a portion of the data present in memory 142 may be communicated to the general purpose handheld computing device 110. As depicted in FIG. 3, the firmware version 304 onboard the luminaire 102; the group 306 associated with the luminaire 102; the current time 308, the current date 310; the daylight savings time indicator 312; and the illumination schedule 314 have all been transferred from the luminaire 102 to the general purpose handheld computing device 110. In some embodiments, luminaire operational data may also be transmitted to the general purpose handheld computing device 110, for example the total elapsed time the luminaire 102 has been in service or the elapsed time the solid state lighting system 164 within the luminaire has been illuminated. Within the general purpose handheld computing device 110, any or all of the data transferred from the luminaire 102 can be changed, altered or updated by a user and the changed, altered or updated data can then be transmitted back to the luminaire 102 where, in some embodiments, the old data in memory 142 is overwritten.

The non-LOS wireless connection 112 between the general purpose handheld computing device 110 and the luminaire 102 can be accomplished automatically, for example a connection may be established immediately when the general purpose handheld computing device 110 is within range of the luminaire 102 or when the general purpose handheld computing device 110 and the luminaire 102 have been previously connected via WiFi® or Bluetooth®. In other embodiments, the non-LOS wireless connection 112 between the general purpose handheld computing device 110 and the luminaire 102 must be manually established, for example by providing one or more codes or passwords to gain access to the controller 138 within the luminaire 102. An example of one such code or password based protocol includes, but is not limited to, requiring the user to input the unique identifier associated with a particular luminaire 102 prior to establishing a non-LOS wireless connection 112 between the luminaire 102 and the general purpose handheld computing device 110.

In some instances, for example when using a simple handheld device such as a fob (e.g., a "key" fob) having a single actuator user interface 136, a visual indication of the luminaire 102 being accessed may not be provided on the handheld device. To ease identification of the specific luminaire accessed via the handheld device, in some embodiments upon establishing the non-LOS wireless connection between the handheld device and the luminaire 102, the lamp 108 may be flashed in a distinctive or predetermined pattern to indicate the luminaire 102 to which the handheld device has connected. Upon completion of the transmission, the lamp 108 may flash the same or a different pattern to acknowledge receipt of the at least one instruction from the handheld device. Alternatively, the range may be restricted such that, typically, only a single luminaire will be within range during operation. Such may, for example, be useful in rural settings to turn off or turn on "yard lights" or "barn lights" in response to delinquent accounts and eventual payment of same.

In some instances, firmware or software data received from the luminaire 102 may be compared to the most current firmware or software release available. If a newer firmware or software version is available, the general purpose handheld computing device 110 may transfer the most recent firmware or software update to the luminaire 102, for example by accessing a global website via the internet, and transmitting the firmware or software to the luminaire 102.

In some instances, one or more machine executable instruction sets executed by the general purpose handheld computing device 110 may also be used to form logically associated groups containing a set of at least two luminaires 102. Logically associated groups may be advantageous, for example where the luminaires 102 within the logically associated group share a common illumination schedule or configuration. In at least some embodiments, the luminaire 102 may be joined with or removed from a logically associated group 306 via the general purpose handheld computing device 110.

Additionally, the system time, date, daylight savings time indication, or similar data maintained within the general purpose handheld computing device 110 may be transmitted to the luminaire 102. In some instances, current time and date data is transmitted immediately upon establishing a connection between the general purpose handheld computing device 110 and the luminaire 102. Within the luminaire 102, the current time and date may be maintained using one or more timers disposed within the microprocessor 144.

Additionally, in at least some embodiments the microprocessor 126 can track time of day or elapsed time and transmit one or more instructions or data sets to one or more luminaires 102 at one or more prescheduled times or predetermined intervals.

One or more manual controls may also be present on the user interface 136. For example, a manual ON button 320 and a manual OFF button 322 may be used to adjust the intensity of the luminaire 102 stepwise from 0% (i.e. OFF) to 100% (i.e. ON). Additionally, one or more slider controls 324 may be used to manually adjust the intensity of the luminaire 102 continuously from 0% to 100%.

Figure 4:
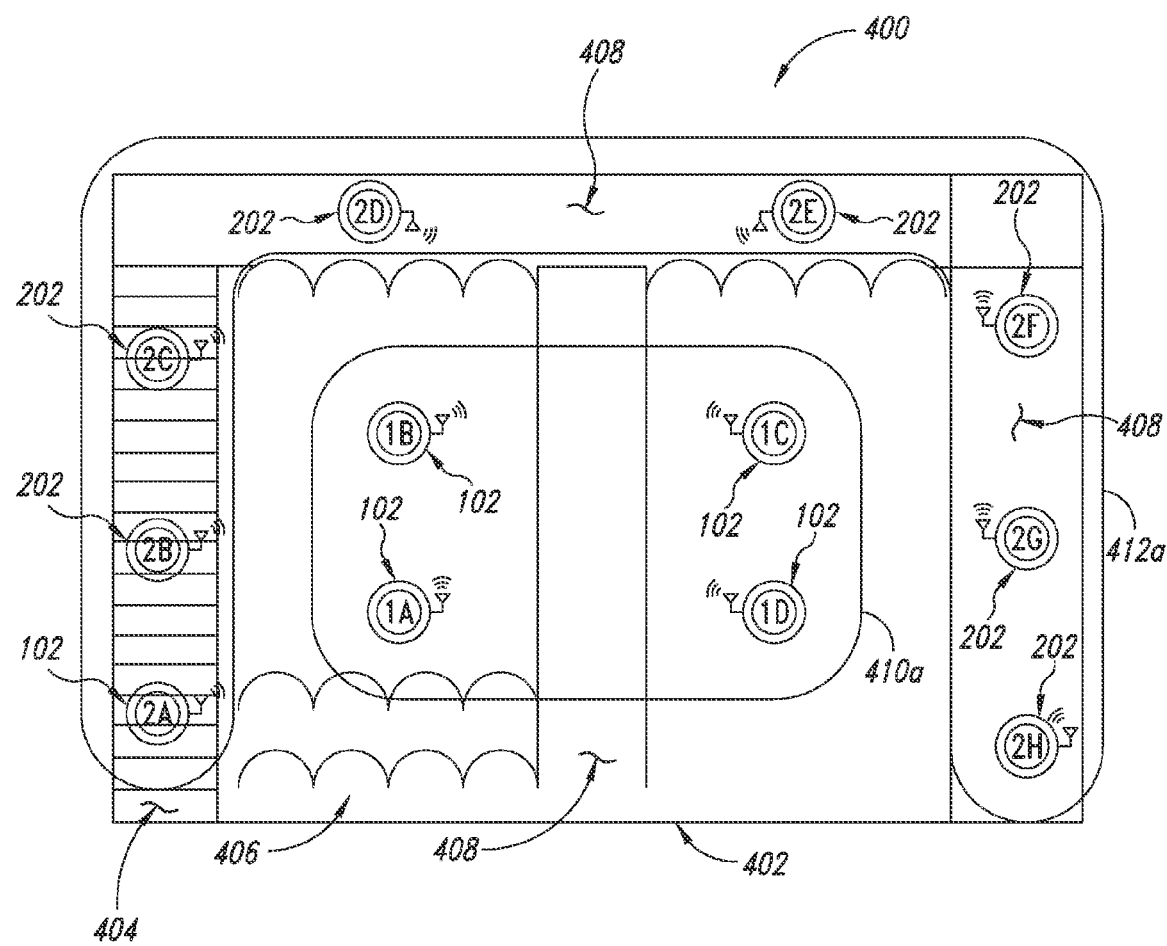
FIG. 4 is a perspective view of a lighting system including a plurality of luminaires and a general purpose handheld computing device, according to one illustrated embodiment.
Figure 4:
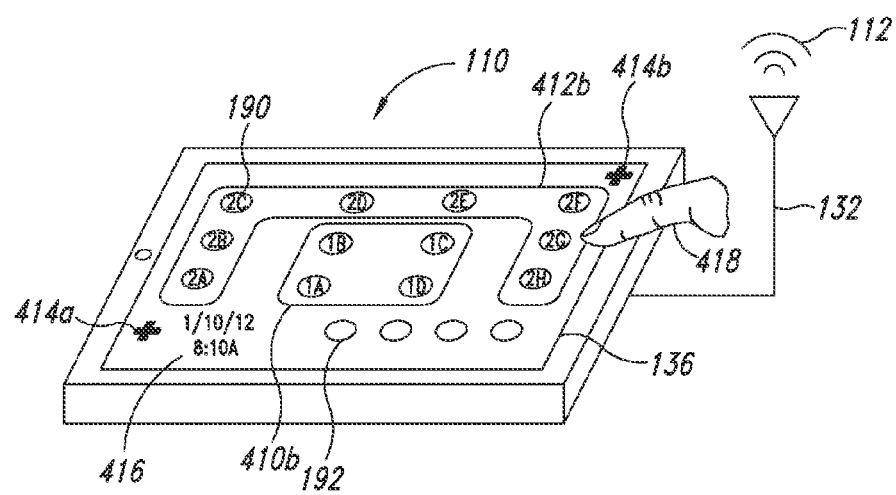

FIG. 4 is a perspective view of a controller and a lighting system 400 including a plurality of luminaires 102, 202 within an illustrative auditorium 402, with the luminaires 102, 202 grouped into a first logical group association 410 and a second logical group association 412. While a user can designate a single luminaire 102 as the destination for an entered instruction or data simply by indicating the specific luminaire 102, 202 on the general purpose handheld computing device 110, in at least some embodiments, using the user interface 136 on the general purpose handheld computing device 110 a user can group a plurality of luminaires 102, 202 into one or more sets, with each independent set of luminaires 102, 202 sharing a common logical group association or configuration.

The auditorium 402 may contain a plurality of the same or different luminaires 102, 202 disposed above multiple areas including stairs 404, seating areas 406, and aisle ways 408. In the auditorium 402, the ability to adjust the intensity of individual luminaires 102, 202 may be particularly useful, however, the time required to individually adjust each luminaire 102, 202 may be potentially distracting to patrons if the intensity of each luminaire 102, 202 is adjusted individually. One attractive solution is to group the luminaires 102, 202 into two or more logical group associations so that instructions or data entered by a user on the general purpose handheld computing device 110 are transmitted to more than one luminaire 102, 202.

For example, using a general purpose handheld computing device 110 having a user interface 136, a user may employ finger gestures 418 on the touchscreen to designate a first set of luminaires sharing a first logical group association 410a and a second set of luminaires sharing a second logical group association 412a. For instance, the first logical group association 410a may group the luminaires disposed above seating areas 406 within the auditorium 402 into the first set. The first logical group association 410a of luminaires may graphically depicted on the user interface 136 as corresponding first logical group association 410b. The user may similarly designate a second logical group association 412a grouping the luminaires disposed above stairs 404 and aisle ways 406 into the second set. The second logical group association 412a of luminaires may graphically depicted on the user interface 136 as corresponding second logical group association 412b. Advantageously, the user interface 136 enables the user to select the desired luminaires 102, 202 by simply tracing around the desired luminaires 102, 202 or tapping on icons associated with the luminaires 102,202 using a finger 418 or stylus to create the first set of luminaires with logical group association 410a and the second set of luminaires with logical group association 412a.

After designating the first and second logical group associations 410b and 412b on the user interface 136, the transceiver 128 within the general purpose handheld computing device 110 transmits a non-LOS wireless signal 112 containing the logical group association data to the luminaires within the auditorium 402. When configured as signal repeaters, luminaires receiving the non-LOS wireless signal 112 may being retransmitting the signal to neighboring luminaires. In at least some embodiments, all or a portion of the luminaires 102, 202 may transmit an acknowledgement signal to the general purpose handheld computing device 110 upon successful receipt of the logical group association data. As the acknowledgement signal from each luminaire is received by the transceiver 128, the corresponding luminaire displayed on the user interface 136 may be visually distinguished from those luminaires who have not yet received the logical group association data and/or transmitted an acknowledgement. For example, the luminaires in group 410a may be displayed in a blue color on the user interface 136 upon successful receipt of the first logical group association data, while the luminaires in group 412a may be displayed in a green color on the user interface 136 upon receipt successful receipt of the second logical group association data.

Using a machine executable instruction set on the general purpose handheld computing device 110, the first and second logical group associations 410b, 412b may be created or disbanded at the discretion and control of the user. However, once the first and second logical group associations 410b and 412b are established, the user is able to adjust one or more functional aspects, such as intensity of the solid-state lighting system 164, of the luminaires within each of the logical group associations using a single instruction or data input on the user interface 136. The ability to transmit a non-LOS wireless signal 112 to a plurality of luminaires 102, 202 within the first or second logical group associations 410a, 412a permits the concurrent, simultaneous, or near-simultaneous adjustment of some or all of the luminaires within each of the logical group associations 410a, 412a thereby speeding the adjustment process within the auditorium 402.

In at least some embodiments, the user interface 136 may designate one or more geographic points 414a, 414b within the auditorium 402 placing the maximum number of luminaires within range of the transceiver 128.

In at least some embodiments, the user interface 136 may visibly distinguish a particular luminaire displayed on the user interface 136 to indicate that the particular luminaire has transmitted an acknowledgement in response to instructions or data transmitted by the general purpose handheld computing device 110. For example, luminaires in the first logical group association 410a may be visually represented using a different shade of blue, or even a completely different color upon receipt of a particular non-LOS wireless signal 112, for example a signal providing a software or firmware update, a signal providing a change in the illumination schedule stored within the controller 138, or a signal providing an updated time, daylight savings time indication, calendar, or the like.

In at least some embodiments, at least a portion of the non-LOS wireless signal 112 communicated from the general purpose handheld computing device 110 to the luminaire can include the current date and time information 416. Current date and time information 416 can be stored within the microprocessor 144 and be used for time-based control of one or more luminaire functions. For example, in a parking lot setting the plurality of luminaires may be programmed to illuminate at dusk based on a signal from the sensor 156, and to reduce illumination intensity to a lower level at a predetermined time communicated by a user's general purpose handheld computing device 110. For example, illumination intensity in a shopping center parking lot may be reduced after 10:00 P when the retail establishments in shopping center have closed for the evening.

Figure 5:
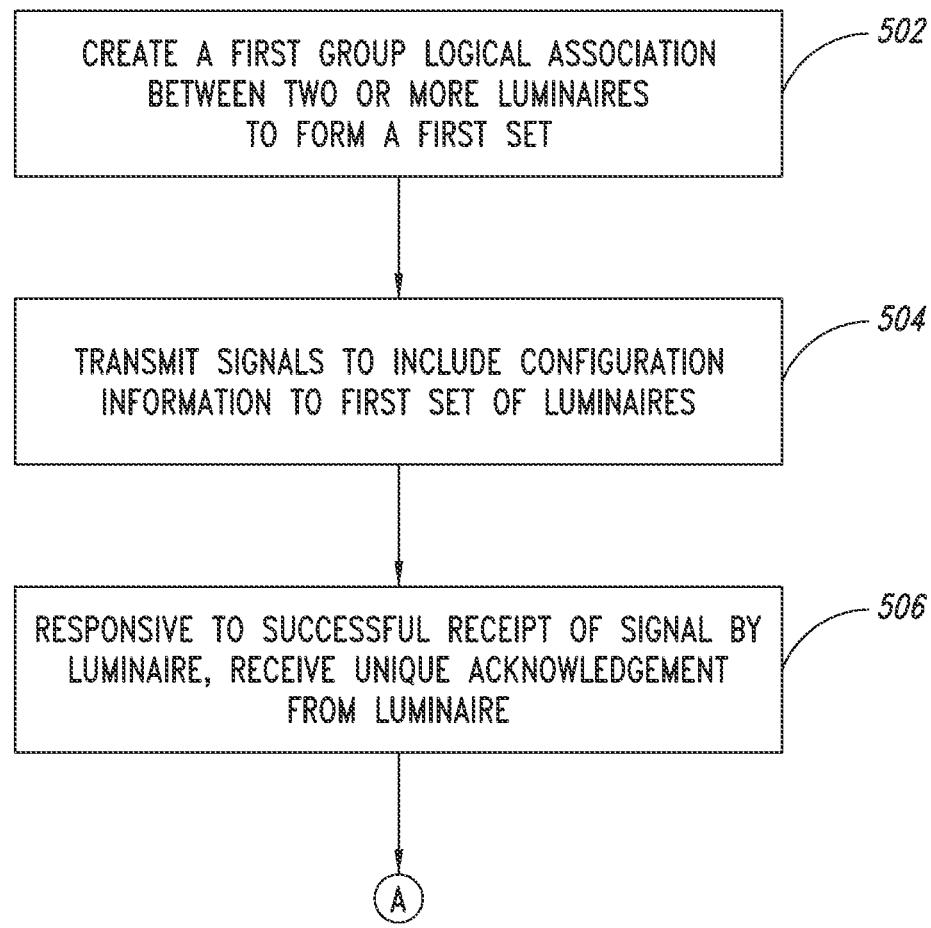
FIG. 5 is a logic flow diagram of a lighting system dimming method executable on a general purpose handheld computing device, according to another illustrated embodiment.

FIG. 5 is a logic flow diagram of a lighting system method 500 executable on a general purpose handheld computing device 110. The method 500 forms a first set of two or more luminaires sharing a first group logical association. Such associations can be useful, for example, where a large number of luminaires share a common configuration. By creating the first group logical association, the need for individually configuring each of the plurality of luminaires is eliminated as the common configuration information will be transmitted to all of the luminaires within the first set.

At 502 a user can create a first set of two or more luminaires that share common configuration information. The creation of the first set can be performed by the user on the general purpose handheld computing device 110 via the user interface 136. In some instances, the creation of the first group logical association may be entered by the user in a tabular format, for example by entering the unique luminaire ID 302 for each of the luminaires that are logically associated. Alternatively, the creation of the logical group association may be entered graphically by the user, for example by tracing around the luminaires that are logically associated or by tapping or touching icons representing respective luminaires. At the conclusion of 502, a first set of luminaires sharing common configuration information have been designated on the user interface 136 as the first logical group association.

At 504 the general purpose handheld computing device 110 can transmit the common configuration information to each of the luminaires in the first set. Since the user has created a logical association within the general purpose handheld computing device 110, the user can enter the desired configuration once and the general purpose handheld computing device 110 will then transmit the configuration information to each of the luminaires 102, 202 included in the first set.

As each luminaire in the first set receives the updated configuration information the luminaire can transmit an acknowledgement including a unique identifier such as the luminaire ID to the general purpose handheld computing device 110. At 506, the general purpose handheld computing device 110 receives the acknowledgement from a particular luminaire after the particular luminaire has received the updated configuration information. In at least some embodiments, responsive to the receipt of the acknowledgement from the luminaire the general purpose handheld computing device 110 can visually distinguish those luminaires from which an acknowledgement has been received from those luminaires from which an acknowledgement has not been received. Visually distinguishing the luminaires having successfully received the updated configuration (e.g., through the use of a change in luminaire icon color, a change in luminaire icon shape or similar aspect, a highlight or marquee appearing around the luminaire icon, etc.) from those not having successfully received the updated configuration provides the user with real time feedback on the success of the update.

Figure 6:
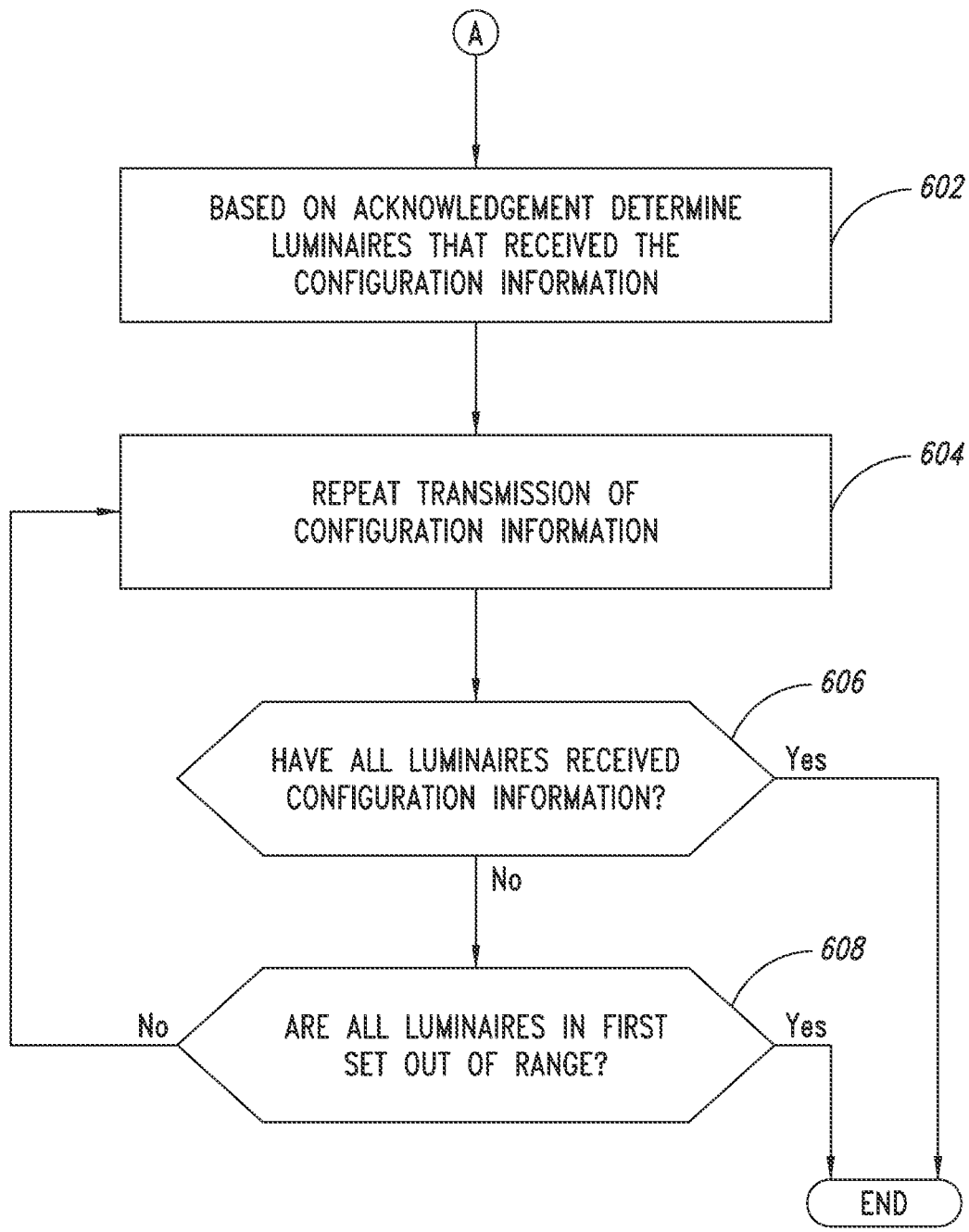
FIG. 6 is a logic flow diagram of another lighting system dimming method executable on a general purpose handheld computing device, according to another illustrated embodiment.

FIG. 6 is a logic flow diagram of another lighting system method 600 executable on a general purpose handheld computing device 110. Continuing from 506, a situation may occur where a portion of the luminaires in the first set have acknowledged receipt of the updated configuration information and the remaining portion have not acknowledged receipt of the updated configuration information. At 602, the general purpose handheld computing device 110 can determine those luminaires that have not yet provided an acknowledgement of receipt of the updated configuration information.

As acknowledgements are received by the general purpose handheld computing device 110, at 604 the microprocessor 126 may continue repeating the transmission of configuration information to those luminaires that have not yet acknowledged receipt of the configuration information. The retransmission of the configuration information may be particularly useful where the luminaires in the first set are distributed across a wide geographic area that may not lie completely within the range of the transceiver 128.

Rather than retransmitting configuration information indefinitely, the microprocessor 126 can at 606 determine whether all of the luminaires within the first set have provided an acknowledgement of receipt of the configuration information. If all luminaires have provided an acknowledgement, the processor can terminate the transmission of the configuration information by the transceiver 128.

There may be an occasion however, where one of the luminaires 102, 202 is unable to either receive the updated configuration or acknowledge receipt of the updated configuration. In such an instance, the microprocessor 126 may retransmit the configuration information indefinitely. To avoid such an occurrence, in some embodiments, at 608 the processor can determine whether the luminaire that has not transmitted an acknowledgement remains within range of the transceiver 128. This capability is particularly useful when the general purpose handheld computing device 110 includes a GPS receiver that permits the processor 128 to determine the distance between the general purpose handheld computing device 110 and the luminaire within the limits of the positional tolerance of the GPS system. If the microprocessor 126 determines the luminaire is no longer within range of the transceiver 128, the microprocessor 128 can terminate the retransmission of configuration information.

Figure 7:
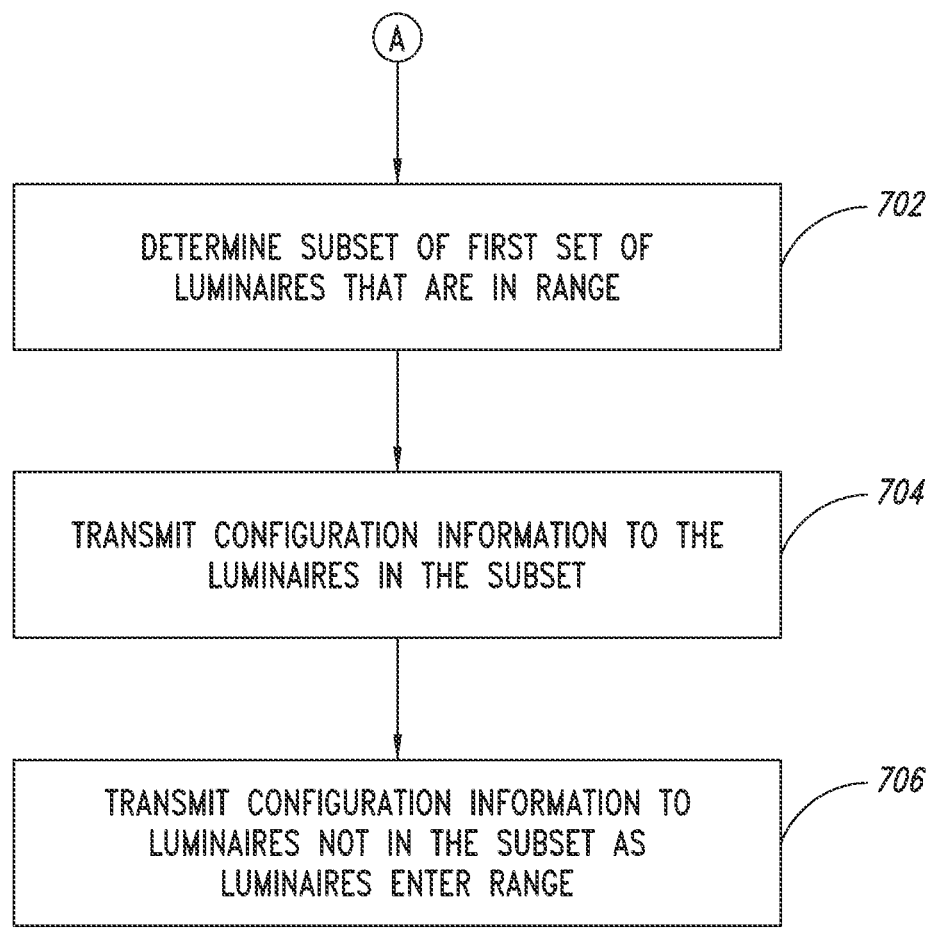
FIG. 7 is a logic flow diagram of another lighting system dimming method executable on a general purpose handheld computing device, according to another illustrated embodiment.

FIG. 7 is a logic flow diagram of another lighting system method 700 executable on a general purpose handheld computing device 110. Continuing from 506, at 702 the microprocessor 126 within a GPS equipped general purpose handheld computing device 110 can determine a subset of luminaires within the first set of luminaires that are currently within range of the transceiver 128.

Rather than transmit configuration information to every luminaire within the first set, at 704, the microprocessor 126 can transmit configuration information only to those luminaires identified as being within the subset of luminaires currently within range of the transceiver 128.

Recognizing that the user of the general purpose handheld computing device 110 may also be moving while the configuration information is being broadcast, at 706, the microprocessor 126 can periodically or continuously determine the distance between the general purpose handheld computing device 110 and all of the luminaires in the subset. As additional luminaires within the subset come within range of the transceiver 128, the microprocessor 126 can transmit configuration information to the additional luminaires.

The arrangements and topologies disclosed herein are merely illustrative and other arrangements and topologies may be employed where consistent with the teachings herein. While specific circuit structures are disclosed, other arrangements that achieve similar functionality may be employed.

The methods illustrated and described herein may include additional acts and/or may omit some acts. The methods illustrated and described herein may perform the acts in a different order. Some of the acts may be performed sequentially, while some acts may be performed concurrently with other acts. Some acts may be merged into a single act through the use of appropriate circuitry. For example, compensation and level shifting may be combined.

The various embodiments described above can be combined to provide further embodiments. U.S. Provisional Patent Application No. 61/641,781, filed May 2, 2012; is incorporated herein by reference, in its entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of operation of a handheld computing device which includes at least one antenna, at least one transceiver communicatively coupled to the at least one antenna, a number of user input elements, at least one processor communicatively coupled to the at least one transceiver, the number of user input elements, and at least one non-transitory storage medium communicatively coupled to the at least one processor and which stores processor executable instructions, the method comprising:

creating a first group logical association between two or more luminaires to form a first set from all available luminaires for common configuration of the two or more luminaires in the first set;

determining via the processor a subset of luminaires of the first group which are within a communications range of the handheld computing device at a first time;

transmitting signals via the transceiver only to the subset of luminaires of the first group, the signals to include configuration information to the luminaires in the first set of luminaires;

transmitting via the transceiver to other luminaires of the first group as the other luminaires fall within the communications range of the handheld computing device at a second time, as a relative position of the handheld computing device changes with respect to the other luminaires; and responsive to successful receipt of the configuration information by a luminaire within the first set, receiving via the transceiver a unique acknowledgement message broadcast by the luminaire.

2. The method of claim 1, further comprising:

responsive to the receipt of the unique acknowledgement message broadcast by the luminaire, determining via the processor the luminaires within in the first set that have received the configuration information; and repeating the transmitting signals via the transceiver, the signals to include configuration information to the luminaires in the first set of luminaires until either of receipt of the transmitting signals which include configuration information by all of the luminaires in the first set or loss of the transmitting signal by all of the luminaires in the first set.

3. The method of claim 1 wherein transmitting signals to the luminaires in the first group includes transmitting signals to all luminaires in the first subset concurrently.

4. The method of claim 1 wherein transmitting signals to the luminaires in the first group includes transmitting signals only to luminaires in the first group that are currently within range of the handheld computing device.

5. The method of claim 3, further comprising:

responsive to the receipt of the unique acknowledgement message broadcast by the luminaire, identifying other luminaires of the first group that have not yet received the configuration information.

6. The method of claim 5, further comprising:

responsive to the identification of the other luminaires of the first group that have not yet received the configuration information, transmitting configuration information to the other luminaires within the first group identified as not yet having received the configuration information.

7. The method of claim 1, further comprising:

retrieving the configuration information from each of the luminaires within the first group;

comparing the retrieved configuration information with the current configuration loaded into the memory of the handheld computing device; and transmitting the current configuration from the memory of the handheld computing device to each of the luminaires within the first group identified as having configuration information different from the current configuration information.

8. The method of claim 7, further comprising:

displaying via the processor, the subset of luminaires on a map displayed on the handheld computing device, the display of each of the luminaires on the map spatially corresponding to a selective physical positioning of each of the luminaires within the subset of luminaires.

9. The method of claim 8, further comprising:

responsive to the receipt via the transceiver of the unique acknowledgement message broadcast by the luminaire, visually indicating on the map those luminaires having received configuration information.

10. The method of claim 8, further comprising:

identifying a single luminaire to receive the current configuration information responsive to an input provided to the handheld computing device.

11. The method of claim 8, further comprising:

identifying a plurality of luminaires to receive the current configuration information responsive to an input provided to the handheld computing device.

12. The method of claim 8, further comprising:

determining via the processor one or more geographic locations placing the greatest number of luminaires within the subset in range of the handheld computing device; and providing a visual indication of the one or more geographic locations on the map displayed on the handheld computing device.

13. The method of claim 8, further comprising:

determining via the processor a minimum number of geographic locations to place all of the luminaires in the subset in range of the handheld computing device; and providing a visual indication of the geographic locations on the map displayed on the handheld computing device.

14. A method of operation of a handheld computing device which includes at least one antenna, at least one transceiver communicatively coupled to the at least one antenna, a number of user input elements, at least one processor communicatively coupled to the at least one transceiver, the number of user input elements, and at least one non-transitory storage medium communicatively coupled to the at least one processor and which stores processor executable instructions, the method comprising:

creating, by the at least one processor, a first group logical association between two or more luminaires which form a first set of all available luminaires for common configuration of the two or more luminaires in the first set;

creating, the at least one processor, a second group logical association between two or more luminaires which form a second set of all available luminaires for common configuration of the two or more luminaires in the second set, the second set not coextensive with the first set;

transmitting signals via the transceiver, the signals to include configuration information to the luminaires in the first set of luminaires;

transmitting signals via the transceiver, the signals to include configuration information to the luminaires in the second set of luminaires;

determining via the processor a first subset of luminaires of the first group which are within a communications range of the handheld computing device at a first time;

determining via the processor a second subset of luminaires of the second group which are within the communications range of the handheld computing device at the first time;

transmitting signals via the transceiver, the signals to include configuration information only to the first subset of luminaires;

transmitting signals via the transceiver, the signals to include configuration information only to the second subset of luminaires;

transmitting to other luminaires of the first set as the other luminaires fall within the communications range of the handheld computing device at a second time, as a relative position of the handheld computing device changes with respect to the other luminaires in the first set; and transmitting to other luminaires of the second set as the other luminaires fall within the communications range of the handheld computing device at the second time, as the relative position of the handheld computing device changes with respect to the other luminaires in the second set.

15. The method of claim 14 wherein:

transmitting signals to the luminaires in the first group includes transmitting signals to all luminaires in the first set concurrently; and transmitting signals to the luminaires in the second group includes transmitting signals to all luminaires in the second set concurrently.

16. The method of claim 14 wherein:

transmitting signals to the luminaires in the first group includes transmitting signals only to luminaires in the first set that are currently within range of the handheld computing device; and transmitting signals to the luminaires in the second group includes transmitting signals only to luminaires in the second set that are currently within range of the handheld computing device.

17. The method of claim 14, further comprising:

responsive to successful receipt of the configuration information by a luminaire within the first set, receiving via the transceiver a unique acknowledgement message broadcast by the luminaire;

responsive to successful receipt of the configuration information by a luminaire within the second set, receiving via the transceiver a unique acknowledgement message broadcast by the luminaire;

responsive to the receipt of the unique acknowledgement message from the luminaire within the first set, identifying via the processor other luminaires of the first group that have not yet received the configuration information; and responsive to the receipt of the unique acknowledgement message from the luminaire within the second set, identifying via the processor other luminaires of the second group that have not yet received the configuration information.

18. The method of claim 17, further comprising:

transmitting configuration information via the transceiver to the other luminaires within the first group identified as not yet having received the configuration information; and transmitting configuration information via the transceiver to the other luminaires within the second group identified as not yet having received the configuration information.

19. The method of claim 17, further comprising:

responsive to the receipt of the unique acknowledgement message broadcast by the luminaire in the first group, determining the luminaires within in the first set that have received the configuration information;

responsive to the receipt of the unique acknowledgement message broadcast by the luminaire in the second group, determining the luminaires within in the second set that have received the configuration information;

repeating the transmitting signals which include configuration information to the luminaires in the first set of luminaires until either of receipt of the transmitting signals which include configuration information by all of the luminaires in the first set or loss of the transmitting signal by all of the luminaires in the first set; and repeating the transmitting signals which include configuration information to the luminaires in the first set of luminaires until either of receipt of the transmitting signals which include configuration information by all of the luminaires in the second set or loss of the transmitting signal by all of the luminaires in the second set.

20. The method of claim 14, further comprising:

displaying the subset of luminaires within the first group on a map displayed on the handheld computing device, the map spatially corresponding to the physical positioning of each of the first set of luminaires; and displaying the subset of luminaires within the second group on a map displayed on the handheld computing device, the map spatially corresponding to the physical positioning of each of the second set of luminaires.

21. A handheld computing device, comprising:

at least one antenna;

at least one transceiver communicatively coupled to the at least one antenna to provide wireless, non-line-of-sight communications with at least one luminaire having at least one solid-state light source;

at least one user interface device;

at least one processor communicatively coupled to the at least one transceiver and communicatively coupled to the at least one at least one user interface device, and at least one non-transitory storage medium communicatively coupled to the at least one processor and which stores at least one of processor executable instructions or data, which when executed by the at least one processor causes the at least one processor to:

present a user interface via the at least one user interface device;

receive user input via the at least one user interface device, the user input which specifies two or more luminaires to form a first set of luminaires and two or more luminaires to form a second set of luminaires;

create a first group logical association between the two or more luminaires which form the first set of luminaires from all available luminaires for common configuration of the two or more luminaires in the first set;

create a second group logical association between the two or more luminaires which form the second set of luminaires from all available luminaires for common configuration of the two or more luminaires in the second set, the second set not coextensive with the first set;

determine a first subset of luminaires of the first group which are within a communications range of the handheld computing device at a first time;

determine a second subset of luminaires of the second group which are within the communications range of the handheld computing device at the first time;

wirelessly transmit signals to only to the first subset of luminaires in the first set of luminaires via the at least one transceiver and the at least one antenna, the signals which include configuration information for the first set of luminaires;

wirelessly transmit signals to only to the second subset of luminaires in the second set of luminaires via the at least one transceiver and the at least one antenna, the signals which include configuration information for the luminaires in the second set of luminaires;

cause the transceiver to transmit signals to other luminaires of the first set as the other luminaires come within the communications range of the handheld computing device at a second time, as a relative position of the handheld computing device changes with respect to the other luminaires in the first set; and cause the transceiver to transmit to other luminaires of the second set as the other luminaires come within the communications range of the handheld computing device at the second time, as the relative position of the handheld computing device changes with respect to the other luminaires in the second set.

22. The handheld computing device of claim 21 wherein execution of the instructions or data cause the processor to cause the transceiver to transmit signals to all luminaires in the first set concurrently.

23. The handheld computing device of claim 21 wherein execution of the instructions or data cause the processor to cause the transceiver to transmit signals only to luminaires in the first set that are currently within range of the handheld computing device.

24. The handheld computing device of claim 21 wherein execution of the instructions or data cause the processor to:
responsive to successful receipt of the configuration information by a luminaire within the first set, receive via the transceiver a unique acknowledgement message broadcast by the luminaire;
responsive to successful receipt of the configuration information by a luminaire within the second set, receive via the transceiver a unique acknowledgement message broadcast by the luminaire;
responsive to the receipt of the unique acknowledgement message from the luminaire within the first set, identify other luminaires of the first group that have not yet received the configuration information; and
responsive to the receipt of the unique acknowledgement message from the luminaire within the second set, identify other luminaires of the second group that have not yet received the configuration information.

25. The handheld computing device of claim 24 wherein execution of the instructions or data cause the processor to:
cause the at least one transceiver to transmit configuration information to the other luminaires within the first group identified as not yet having received the configuration information; and
cause the at least one transceiver to transmit configuration information to the other luminaires within the second group identified as not yet having received the configuration information.

26. The handheld computing device of claim 24 wherein execution of the instructions or data cause the processor to:
responsive to the receipt of the unique acknowledgement message broadcast by the luminaire in the first group, determine the luminaires within in the first set that have received the configuration information;
responsive to the receipt of the unique acknowledgement message broadcast by the luminaire in the second group, determine the luminaires within in the second set that have received the configuration information;
repeatedly transmit signals which include configuration information to the luminaires in the first set of luminaires until either of receipt of the transmitting signals which include configuration information by all of the luminaires in the first set or loss of the transmitting signal by all of the luminaires in the first set; and
repeatedly transmit signals which include configuration information to the luminaires in the first set of luminaires until either of receipt of the transmitting signals which include configuration information by all of the luminaires in the second set or loss of the transmitting signal by all of the luminaires in the second set.

27. The handheld computing device of claim 21 wherein execution of the instructions or data cause the processor to:
cause the at least one user interface device to display the subset of luminaires within the first group on a map displayed on the handheld computing device, the map spatially corresponding to the physical positioning of each of the first set of luminaires; and
cause the at least one user interface device to display the subset of luminaires within the second group on a map displayed on the handheld computing device, the map spatially corresponding to the physical positioning of each of the second set of luminaires.

28. The handheld computing device of claim 21 wherein execution of the instructions or data cause the processor to encrypt communications to the at least one luminaire and to decrypt communications from the at least one luminaire.

29. The handheld computing device of claim 21, further comprising:
a global positioning transceiver that produces location information indicative of a present location of the handheld computing device, and wherein the at least one processor stores geographic location information logically associated with a set of luminaire specific information, and wherein execution of the instructions or data cause the processor to store the geographic location information logically associated with luminaire specific information in the form of a map of a lighting system.

30. The handheld device of claim 21 wherein the at least one non-transitory storage medium stores a security feature communicable via the transmitter to each of the plurality of luminaires.

31. The handheld device of claim 30 wherein the security feature includes at least one of: a code associated with a user of the handheld device; a code uniquely associated with each of the plurality of luminaires; a code commonly associated with the plurality of luminaires; and a code associated with a geographic location of each of the plurality of luminaires.

* * * * *